United States Patent
Aikawa

(10) Patent No.: US 10,340,959 B2
(45) Date of Patent: Jul. 2, 2019

(54) FRONT-END MODULE AND COMMUNICATION DEVICE

(71) Applicant: Murata Manufacturing Co., Ltd., Nagaokakyo-shi, Kyoto-fu (JP)

(72) Inventor: Kiyoshi Aikawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/142,081

(22) Filed: Sep. 26, 2018

(65) Prior Publication Data

US 2019/0140669 A1 May 9, 2019

(30) Foreign Application Priority Data

Sep. 29, 2017 (JP) .................................. 2017-190340

(51) Int. Cl.
*H04B 1/16* (2006.01)
*H04B 1/00* (2006.01)

(52) U.S. Cl.
CPC ............... *H04B 1/006* (2013.01); *H04B 1/16* (2013.01)

(58) Field of Classification Search
CPC ........ H04B 1/16; H04B 1/006; H04B 1/0057; H04B 1/0067; H04B 1/0053; H04W 72/0453; H04W 28/065; H03F 3/21; H03F 3/19
See application file for complete search history.

(56) References Cited

U.S. PATENT DOCUMENTS

| | | | |
|---|---|---|---|
| 10,177,715 B1 * | 1/2019 | Ayranci | H03F 1/26 |
| 2015/0077194 A1 | 3/2015 | Ebihara et al. | |
| 2016/0127025 A1 * | 5/2016 | Wloczysiak | H04B 7/08 375/267 |
| 2018/0069574 A1 * | 3/2018 | Kondo | H03F 3/245 |
| 2018/0123549 A1 * | 5/2018 | Takeuchi | H04B 1/40 |
| 2018/0248569 A1 * | 8/2018 | Takenaka | H04B 1/50 |

FOREIGN PATENT DOCUMENTS

JP     2015-061198 A     3/2015

\* cited by examiner

*Primary Examiner* — Thanh C Le
(74) *Attorney, Agent, or Firm* — Keating & Bennett, LLP

(57) ABSTRACT

A front-end module includes a switch, a first filter including an input end connected to a first selection terminal, a second filter including input end connected to a second selection terminal, and an impedance matching circuit connected to a selection terminal, a pass band impedance when viewing the first filter side from a common terminal in a state in which the common terminal and only the first selection terminal are connected is different from a pass band impedance when viewing the second filter side from the common terminal in a state that the common terminal and only the second selection terminal are connected. When the common terminal and the first selection terminal are connected, the common terminal and the selection terminal are connected, and when the common terminal and the second selection terminal are connected, the common terminal and the selection terminal are not connected.

16 Claims, 15 Drawing Sheets

FRONT-END MODULE AND COMMUNICATION DEVICE

CROSS REFERENCE TO RELATED APPLICATIONS

This application claims the benefit of priority to Japanese Patent Application No. 2017-190340 filed on Sep. 29, 2017. The entire contents of this application are hereby incorporated herein by reference.

BACKGROUND OF THE INVENTION

1. Field of the Invention

The present invention relates to a front-end module and a communication device.

2. Description of the Related Art

In recent years, a mobile communication terminal has been desired to enable multi-band in which one terminal supports a plurality of frequency bands. Accordingly, for example, a front-end circuit disposed between an antenna element and an amplifier is also desired to enable the multi-band.

Japanese Unexamined Patent Application Publication No. 2015-61198 discloses a multi-band-supported front end circuit which includes a switch and four filters disposed between a common antenna and two transmission amplification circuits and two reception amplifier circuits. An impedance matching circuit including an inductor is provided in each signal path connecting the switch and each filter.

However, when an individual impedance matching circuit is provided for each signal path as in the front end circuit disclosed in Japanese Unexamined Patent Application Publication No. 2015-61198, the number of circuit elements defining the impedance matching circuit increases and the front end circuit becomes large in size in accordance with an advance of the multi-band (an increase in the number of supported bands). Further, signal transmission loss increases for each signal path.

SUMMARY OF THE INVENTION

Preferred embodiments of the present invention provide front-end modules and communication devices in which the signal transmission loss and the number of circuit elements are reduced.

According to a preferred embodiment of the present invention, a front-end module includes a first switch including a first common terminal and a plurality of selection terminals; a first filter including a first frequency band as a pass band, a first input/output terminal, and a second input/output terminal, the first input/output terminal being connected to a first selection terminal among the plurality of selection terminals; a second filter including a second frequency band different from the first frequency band as a pass band, a third input/output terminal, and a fourth input/output terminal, the third input/output terminal being connected to a second selection terminal among the plurality of selection terminals; and a first impedance matching circuit connected to one or more selection terminals different from the first selection terminal and the second selection terminal among the plurality of selection terminals. An impedance in the first frequency band when viewing a first filter side from the first common terminal in a state that the first common terminal is connected to only the first selection terminal among the plurality of selection terminals is different from an impedance in the second frequency band when viewing a second filter side from the first common terminal in a state that the first common terminal is connected to only the second selection terminal among the plurality of selection terminals. When the first common terminal is in a connection state with the first selection terminal and the first common terminal is in a non-connection state with the second selection terminal, the first common terminal is in a connection state with one selection terminal among the one or more selection terminals, and when the first common terminal is in a connection state with the second selection terminal and the first common terminal is in a non-connection state with the first selection terminal, the first common terminal is in a non-connection state with the one selection terminal.

According to the above-described configuration, when the first switch and the first filter are connected, since the first impedance matching circuit is connected on a path connecting the first switch and the first filter with the one selection terminal interposed therebetween, an impedance when viewing the first filter side from the first common terminal is able to be adjusted to a predetermined impedance. On the other hand, when the first switch and the second filter are connected, the first impedance matching circuit is not connected on the path connecting the first switch and the first filter with the one selection terminal interposed therebetween. In this case, although the connection state of the first impedance matching circuit on the above-described path is different, since an impedance in the first frequency band when viewing the first filter side from the first common terminal in a state that the first common terminal and the first selection terminal are connected is different from an impedance in the second frequency band when viewing the second filter side from the first common terminal in a state that the first common terminal and the second selection terminal are connected, the impedance when viewing the second filter side from the first common terminal is able to be adjusted to the predetermined impedance.

Therefore, it is possible to reduce loss of signal transmission and the number of circuit elements as compared to a front-end module of the related art in which an impedance matching circuit is provided for each signal path between a first switch and a filter.

Further, a front-end module according to a preferred embodiment of the present invention may further include a second impedance matching circuit connected to the first common terminal.

In both cases when the first filter is selected and when the second filter is selected, an impedance when viewing each filter side from the first common terminal is able to be adjusted to the predetermined impedance. By connecting the second impedance matching circuit, each impedance when viewing each filter side from a corresponding node is able to be matched to a normalized impedance of the front-end module.

In addition, a first wire connecting the first filter and the first selection terminal may be longer than a second wire connecting the second filter and the second selection terminal, and an impedance in the first frequency band when viewing the first filter alone from the first input/output terminal and an impedance in the second frequency band when viewing the second filter alone from the third input/output terminal may be higher than the normalized impedance of the front-end module, and the first impedance matching circuit may include an inductor connected between the one or more selection terminals and a ground.

Thus, in a state in which the first common terminal and the second filter are connected, the impedance when viewing the second filter side from the first common terminal becomes an impedance which is shifted to be more capacitive than an impedance of the second filter alone due to parasitic capacitance of the second wire and the first switch.

On the other hand, in a state in which the first common terminal and the first filter are connected, the impedance when viewing the first filter side from the first common terminal becomes an impedance which is shifted to be furthermore capacitive than an impedance in a state in which the first common terminal is connected to the second filter due to parasitic capacitance of the first wire longer than the second wire and the first switch. However, since a shunt inductor defining the first impedance matching circuit is connected, the impedance when viewing the first filter side from the first common terminal is shifted counterclockwise along an equiconductance circle on an immittance chart, and thus, is equal or substantially equal to an impedance when viewing the second filter side from the first common terminal in a state in which the first common terminal and the second filter are connected.

In addition, the first impedance matching circuit may include a first parallel matching circuit connected between a third selection terminal among the plurality of selection terminals and the ground, and the first switch may exclusively switch between conduction between the first selection terminal and the first common terminal and conduction between the second selection terminal and the first common terminal and may switch between conduction and non-conduction between the third selection terminal and the first common terminal.

Accordingly, the first parallel matching circuit is able to be shunt-connected on a path connecting the first common terminal and the first filter or the second filter. Thus, an impedance when viewing the filter side from the first common terminal is able to be matched to the above-described predetermined impedance.

In addition, the first impedance matching circuit may further include a second parallel matching circuit connected between a fourth selection terminal among the plurality of selection terminals and the ground, and the first switch may exclusively switch between conduction between the first selection terminal and the first common terminal and conduction between the second selection terminal and the first common terminal, may switch between conduction and non-conduction between the third selection terminal and the first common terminal, and may switch between conduction and non-conduction between the fourth selection terminal and the first common terminal.

Accordingly, the first parallel matching circuit and/or the second parallel matching circuit is able to be shunt-connected on the path connecting the first common terminal and the first filter or the second filter. Thus, the impedance when viewing the filter side from the first common terminal is able to be matched in a wide band and with a high degree of accuracy.

In addition, the first impedance matching circuit may include a first series matching circuit connected between a fifth selection terminal and a sixth selection terminal among the plurality of selection terminals, and the first switch may exclusively switch between one of connection between the first selection terminal and the first common terminal and conduction between the first selection terminal and the first common terminal via the sixth selection terminal, the first series matching circuit, and the fifth selection terminal, and one of connection between the second selection terminal and the first common terminal and conduction between the second selection terminal and the first common terminal via the sixth selection terminal, the first series matching circuit, and the fifth selection terminal.

Accordingly, the first series matching circuit is able to be inserted in series on the path connecting the first common terminal and the first filter or the second filter. Thus, the impedance when viewing the filter side from the first common terminal is able to be matched with a high degree of accuracy.

In addition, the first impedance matching circuit may further include a second series matching circuit connected between a seventh selection terminal and an eighth selection terminal among the plurality of selection terminals, and the sixth selection terminal and the seventh selection terminal are connected. The first switch may exclusively switch between one of connection between the first selection terminal and the first common terminal, conduction between the first selection terminal and the first common terminal via the sixth selection terminal, the first series matching circuit, and the fifth selection terminal, conduction between the first selection terminal and the first common terminal via the eighth selection terminal, the second series matching circuit, and the seventh selection terminal, and conduction between the first selection terminal and the first common terminal via the fifth selection terminal, the first series matching circuit, the sixth selection terminal, the seventh selection terminal, the second series matching circuit, and the eighth selection terminal; and one of connection between the second selection terminal and the first common terminal, conduction between the second selection terminal and the first common terminal via the sixth selection terminal, the first series matching circuit, and the fifth selection terminal, conduction between the second selection terminal and the first common terminal via the eighth selection terminal, the second series matching circuit, and the seventh selection terminal, and conduction between the second selection terminal and the first common terminal via the fifth selection terminal, the first series matching circuit, the sixth selection terminal, the seventh selection terminal, the second series matching circuit, and the eighth selection terminal.

Accordingly, the first series matching circuit and/or the second series matching circuit is able to be inserted in series on the path connecting the first common terminal and the first filter or the second filter. Thus, output impedance of a first amplifier and a second amplifier is able to be matched in a wide band and with a high degree of accuracy.

Further, a front-end module according to a preferred embodiment of the present invention may include a second switch including a second common terminal, a ninth selection terminal, and a tenth selection terminal, and an amplifier connected to the second common terminal, and the second input/output terminal and the ninth selection terminal may be connected, the fourth input/output terminal and the tenth selection terminal may be connected, and the second switch may switch between connection and non-connection between the amplifier and the first filter, and may switch between connection and non-connection between the amplifier and the second filter.

As a result, it is possible to provide a front-end module in which loss of signal transmission and the number of circuit elements are reduced.

Further, according to a preferred embodiment of the present invention, a communication device includes an RF signal processing circuit that processes a high-frequency signal received by an antenna element, and one of the above-described front-end modules according to preferred embodiments of the present invention that transmits the high-frequency signal between the antenna element and the RF signal processing circuit.

As a result, it is possible to provide communication devices in which loss of signal transmission and the number of circuit elements are reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to examples, modifications, a comparative example, and drawings. Each of the following examples and modifications represents a comprehensive or specific example. Numerical values, shapes, materials, components, arrangement and connection configurations of components and other features and elements described in the following examples and modifications are merely examples, and are not intended to limit the present invention.

Figure 1A:
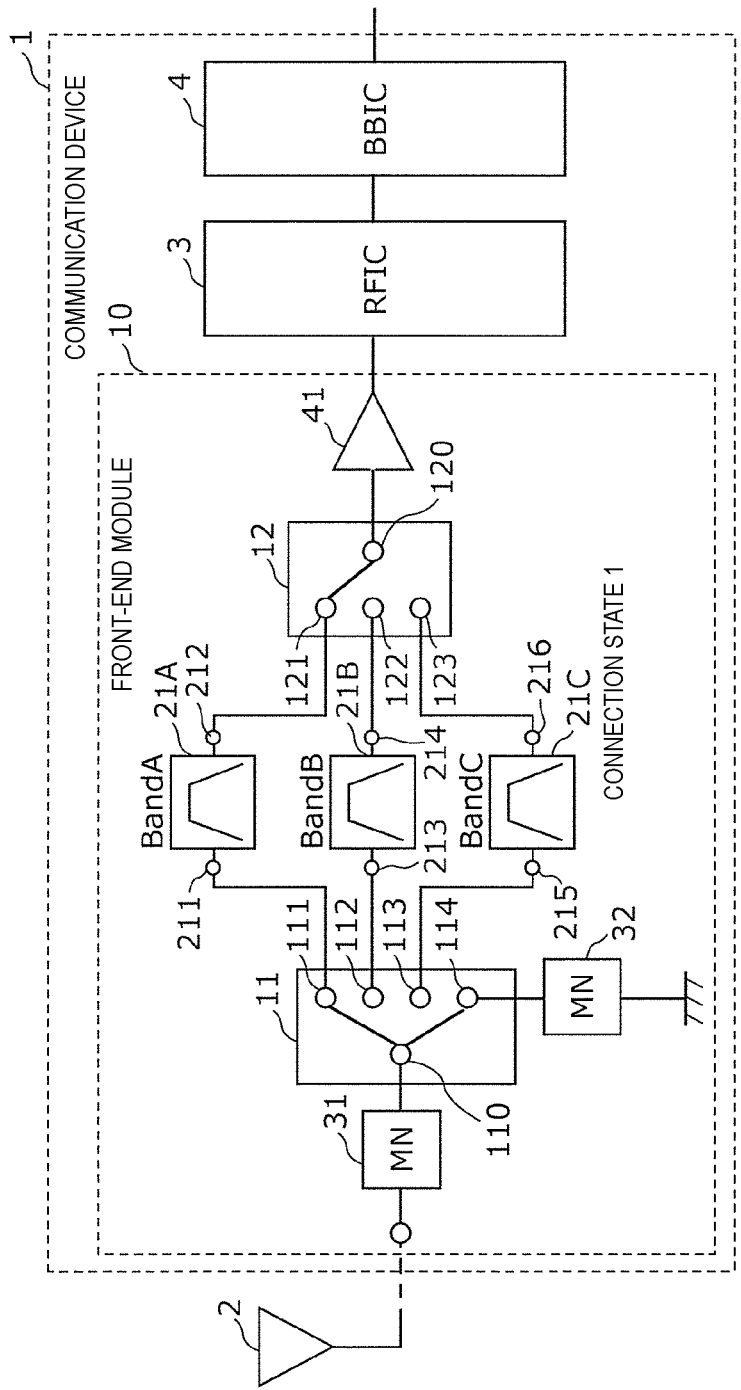
FIG. 1A is a circuit diagram of a communication device and an antenna element in a connection configuration 1 according to a preferred embodiment of the present invention.
Figure 1B:
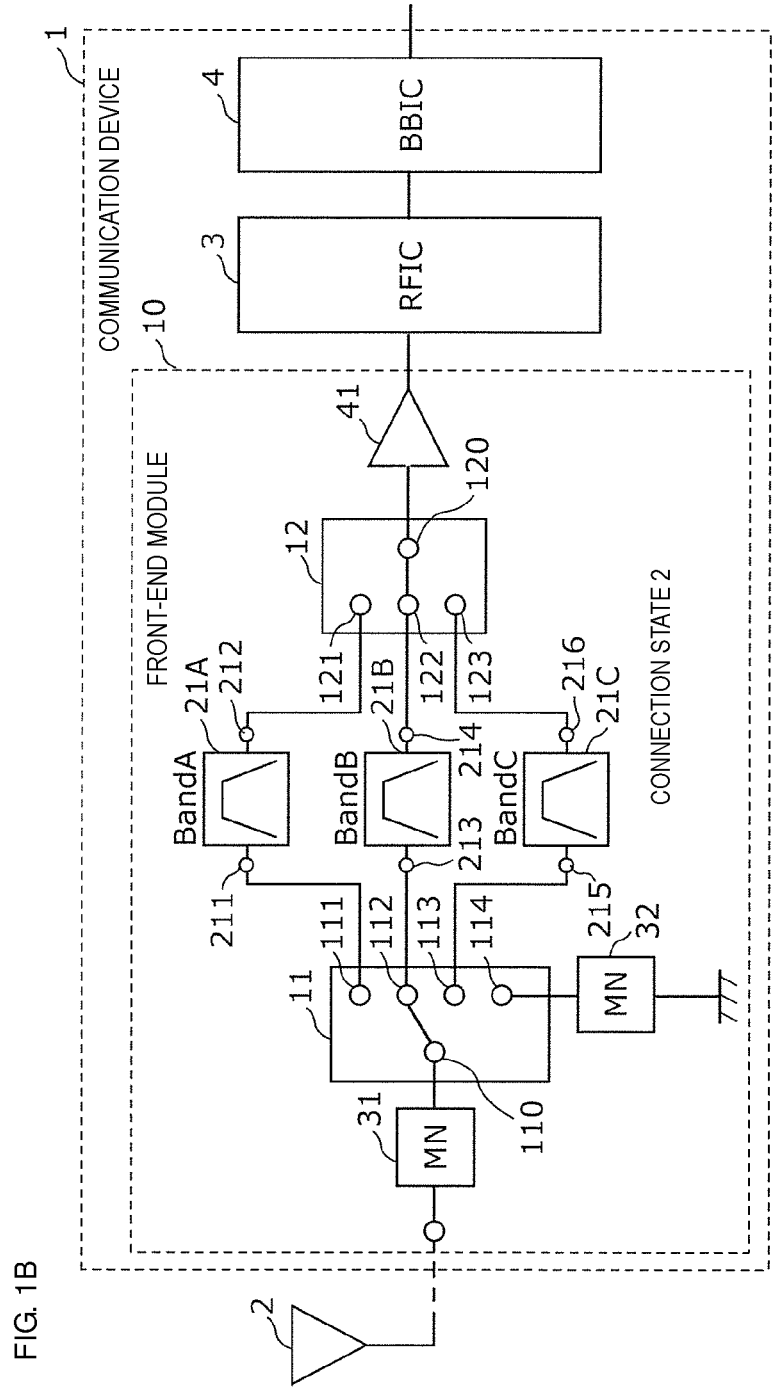
FIG. 1B is a circuit diagram of a communication device and an antenna element in a connection configuration 2 according to a preferred embodiment of the present invention.

FIG. 1A is a circuit diagram of a communication device 1 and an antenna element 2 in a connection configuration 1 according to a preferred embodiment of the present invention. FIG. 1B is a circuit diagram of the communication device 1 and the antenna element 2 in a connection configuration 2 according to a preferred embodiment of the present invention. As illustrated in FIGS. 1A and 1B, the communication device 1 includes a front-end module 10, an RF signal processing circuit (RFIC) 3, and a baseband signal processing circuit (BBIC) 4.

The RFIC 3 is an RF signal processing circuit that processes high-frequency signals transmitted and received by the antenna element 2. Specifically, the RFIC 3 performs signal processing on a high-frequency signal (here, a high-frequency reception signal) input from the antenna element 2 with the front-end module 10 interposed therebetween, by down-conversion or other suitable processing, and outputs a reception signal generated by the signal processing to the BBIC 4. Further, the RFIC 3 is also able to perform signal processing on a transmission signal input from the BBIC 4 by up-conversion or other suitable processing, and is able to output a high-frequency signal (here, a high-frequency transmission signal) generated by the signal processing to a transmission side signal path.

In addition, in the present preferred embodiment, the RFIC 3 also defines and functions as a controller that controls connection of switches 11 and 12 (to be described later) of the front-end module 10 based on a frequency band (band) to be used. Specifically, the RFIC 3 switches between selection terminals connected to a common terminal for the switches 11 and 12 in accordance with a control signal (not shown). Note that the controller may be provided outside the RFIC 3, or may be provided in, for example, the front-end module 10 or the BBIC 4.

Next, a detailed configuration of the front-end module 10 will be described.

As illustrated in FIGS. 1A and 1B, the front-end module 10 is a reception system front-end circuit and includes the switches 11 and 12, filters 21A, 21B, and 21C, a reception amplifier circuit 41, and impedance matching circuits 31 and 32.

The switch 11 is disposed between the impedance matching circuit 31 and the filters 21A to 21C and is a first switch including a common terminal 110 (first common terminal), and selection terminals 111 (first selection terminal), 112 (second selection terminal), 113 and 114. The switch 11 exclusively switches among conduction between the selection terminal 111 and the common terminal 110, conduction between the selection terminal 112 and the common terminal 110, and conduction between the selection terminal 113 and the common terminal 110. Further, the switch 11 switches between conduction and non-conduction between the common terminal 110 and the selection terminal 114.

In other words, the switch 11 is preferably a multiport ON switch that is capable of simultaneously performing connection between the common terminal 110 and the selection terminal 111 and connection between the common terminal 110 and the selection terminal 114, simultaneously performing connection between the common terminal 110 and the selection terminal 112 and connection between the common terminal 110 and the selection terminal 114, or simultaneously performing connection between the common terminal 110 and the selection terminal 113 and connection between the common terminal 110 and the selection terminal 114.

The filter 21A includes input/output terminals 211 (first input/output terminal) and 212 (second input/output terminal), and is a first filter in which the input/output terminal 211 is connected to the selection terminal 111, and has a Band A (first frequency band) as a pass band.

The filter 21B includes input/output terminals 213 (third input/output terminal) and 214 (fourth input/output terminal), and is a second filter in which the input/output terminal 213 is connected to the selection terminal 112, and has a Band B (second frequency band) as a pass band.

The filter 21C includes input/output terminals 215 and 216, and is a filter in which the input/output terminal 215 is connected to the selection terminal 113, and has a Band C as a pass band.

The switch 12 is a second switch including a common terminal 120 (second common terminal), and selection terminals 121 (ninth selection terminal), 122 (tenth selection terminal), and 123. The common terminal 120 is connected to an input terminal of the reception amplifier circuit 41, the selection terminal 121 is connected to the input/output terminal 212 of the filter 21A, the selection terminal 122 is connected to the input/output terminal 214 of the filter 21B, and the selection terminal 123 is connected to the input/output terminal 216 of the filter 21C. The switch 12 is preferably an SP3T (Single Pole 3 Throw) switching circuit in which the common terminal 120 and one of the selection terminals 121 to 123 are able to be connected.

The reception amplifier circuit 41 includes an output terminal connected to the RFIC 3 and amplifies high-frequency signals input from the filters 21A to 21C with the switch 12 interposed therebetween, and is preferably a low noise amplifier circuit including, for example, a transistor or other suitable component.

In the above-described configuration, in the front-end module 10, one of the filters 21A to 21C is connected to the antenna element 2 and the reception amplifier circuit 41, by switching performed by the switches 11 and 12.

The impedance matching circuit 32 is a first impedance matching circuit connected to the selection terminal 114 different from the selection terminals 111, 112, and 113 among the plurality of selection terminals of the switch 11. Note that in FIGS. 1A and 1B, the impedance matching circuit 32 is a first parallel matching circuit connected between the selection terminal 114 and the ground, and is configured to be shunt-connected to the switch 11, but it is sufficient that one end of the impedance matching circuit 32 is connected to the selection terminal 114, and a connection destination of another end may not necessarily be grounded.

The impedance matching circuit 31 is a second impedance matching circuit disposed between the antenna element 2 and the switch 11, and connected to the common terminal 110. Note that, although in FIGS. 1A and 1B, in a circuit configuration, the impedance matching circuit 31 is inserted in series on a path connecting the antenna element 2 and the switch 11, it is sufficient that one end of the impedance matching circuit 31 is connected to the above-described path, and a connection destination of another end may be grounded.

Each of the impedance matching circuits 31 and 32 has a circuit configuration in which, for example, circuit elements, such as an inductor and a capacitor, are connected in series or in parallel.

In this case, an impedance in the Band A when viewing the filter 21A side from the common terminal 110 in a state in which the common terminal 110 and only the selection terminal 111 among the selection terminals 111 to 114 are connected is different from an impedance in the Band B when viewing the filter 21B side from the common terminal 110 in a state that the common terminal 110 and only the selection terminal 112 among the selection terminals 111 to 114 are connected.

As illustrated in FIG. 1A, when the common terminal 110 and the selection terminal 111 are in the connection state and the common terminal 110 and the selection terminal 112 are in the non-connection state, the common terminal 110 and the selection terminal 114 are in the connection state (connection state 1). On the other hand, as illustrated in FIG. 1B, when the common terminal 110 and the selection terminal 112 are in the connection state and the common terminal 110 and the selection terminal 111 are in the non-connection state, the common terminal 110 and the selection terminal 114 are in the non-connection state (connection state 2).

As illustrated in FIG. 1A, when the switch 11 and the filter 21A are connected, since the impedance matching circuit 32 is connected on a path connecting the switch 11 and the filter 21A with the selection terminal 114 interposed therebetween (connection state 1), an impedance when viewing the filter 21A side from the common terminal 110 is able to be adjusted to a predetermined impedance. On the other hand, as illustrated in FIG. 1B, when the switch 11 and the filter 21B are connected, the impedance matching circuit 32 is not connected on the path connecting the switch 11 and the filter 21A with the selection terminal 114 interposed therebetween (connection state 2). In this case, although the impedance matching circuit 32 is not connected on the above-described path, an impedance in the Band A when viewing the filter 21A side from the common terminal 110 in a state that the common terminal 110 and only the selection terminal 111 are connected is different from an impedance in the Band B when viewing the filter 21B side from the common terminal 110 in a state that the common terminal 110 and only the selection terminal 112 are connected, and therefore, an impedance when viewing the filter 21B side from the common terminal 110 is able to be adjusted to the predetermined impedance.

Note that, in the present preferred embodiment, "an impedance in the Band A is different from an impedance in the Band B" is defined such that an impedance obtained by averaging impedances in the Band A and an impedance obtained by averaging impedances in the Band B differ from each other by about 5% or more. Therefore, even if an impedance at a predetermined frequency in the Band A is equal or substantially equal to an impedance at a predetermined frequency in the Band B, for example, a case in which "an impedance in the band A is different from an impedance in the Band B" may also be assumed.

Note that the impedance matching circuit 31 may be omitted. Although an impedance when viewing each filter side from the common terminal 110 is adjusted to the above-described predetermined impedance by conduction and non-conduction of the impedance matching circuit 32, the impedance matching circuit 31 is a circuit that matches the predetermined impedance with a normalized impedance of the front-end module 10. Therefore, when the predetermined impedance is already the normalized impedance, the impedance matching circuit 31 is unnecessary.

Note that the "normalized impedance" is not limited to about 50Ω, for example, and is sufficient to be equal or substantially equal to an impedance of a transmission system of the front-end module 10. In other words, a characteristic impedance of a transmission line defining the front-end module 10 and a characteristic impedance of a transmission line connected to the front-end module 10 are not limited to about 50Ω.

Further, the "normalized impedance" is not limited to an impedance equal or substantially equal to the impedance of the transmission system, and it may be an impedance matched with a circuit (the antenna element 2 in the present preferred embodiment) connected to an input end of the front-end module 10. For example, two impedances to be matched may be a complex conjugate.

Further, while the front-end module 10 according to the present preferred embodiment includes the filters 21A to 21C, the number of filters, that is, the number of bands to be used may be two, or may be four or more, for example.

Further, although the reception amplifier circuit 41 is shared by high-frequency signals of the Band A, the Band B, and the Band C, by switching the switch 12, a reception amplifier circuit may be provided for each band. In this case, the switch 12 is unnecessary.

Further, although the configuration in which the front-end module 10 according to the present preferred embodiment is connected to the antenna element 2 is illustrated, the front-end module 10 may not necessarily be connected directly to the antenna element 2. For example, the front-end module 10 may be disposed with circuit elements, such as a branching filter, a switch, and a circulator, connected to the antenna element 2 interposed therebetween.

Figure 2:
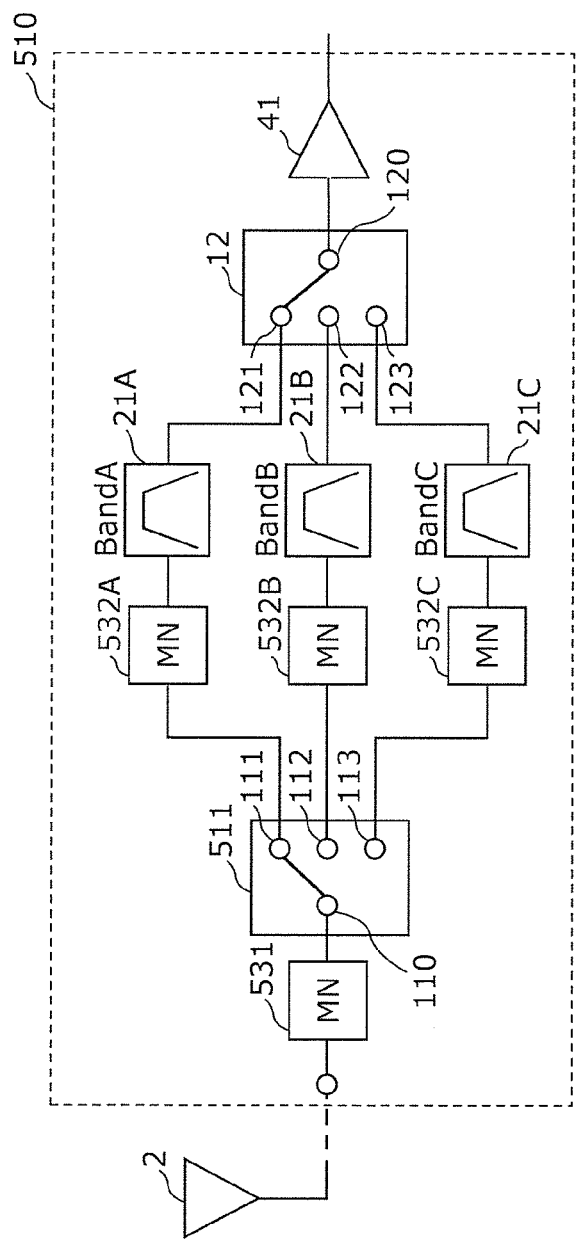
FIG. 2 is a circuit diagram of a front-end module according to a comparative example.

FIG. 2 is a circuit diagram of a front-end module 510 according to a comparative example. The front-end module 510 illustrated in FIG. 2 includes a switch 511, the switch 12, the filters 21A, 21B, and 21C, the reception amplifier circuit 41, and impedance matching circuits 531, 532A, 532B, and 532C. The front-end module 510 according to the comparative example differs from the front-end module 10 according to the present preferred embodiment in a configuration of the switch 511 and in that the impedance matching circuit is provided for each signal path. Hereinafter, as a specific configuration of the front-end module 510, a description of the same configuration as that of the front-end module 10 according to the present preferred embodiment will be omitted, and a different configuration is mainly described.

The switch 511 is a switching circuit disposed between the impedance matching circuit 531 and the filters 21A to 21C and includes the common terminal 110 and the selection terminals 111, 112, and 113. The switch 511 exclusively switches among conduction between the selection terminal 111 and the common terminal 110, conduction between the selection terminal 112 and the common terminal 110, and conduction between the selection terminal 113 and the common terminal 110.

The impedance matching circuit 532A is connected between the selection terminal 111 and the filter 21A. The impedance matching circuit 532B is connected between the selection terminal 112 and the filter 21B. The impedance matching circuit 532C is connected between the selection terminal 113 and the filter 21C. In FIG. 2, each of the impedance matching circuits 532A to 532C has a circuit configuration in which the circuit is inserted in series on a path connecting each selection terminal of the switch 511 and each filter, but it is sufficient that one end is connected to the path, and a connection destination of another end may be grounded.

In the front-end module 510 according to the comparative example, since the impedance matching circuits 532A, 532B and 532C are disposed corresponding to the signal paths, an impedance in the Band A when viewing the filter 21A side from the common terminal 110 in a state in which the common terminal 110 and only the selection terminal 111 are connected, an impedance in the Band B when viewing the filter 21B side from the common terminal 110 in a state in which the common terminal 110 and only the selection terminal 112 are connected, and an impedance in the Band C when viewing the filter 21C side from the common terminal 110 in a state in which the common terminal 110 and only the selection terminal 113 are connected are equal or substantially equal, and are adjusted to a predetermined impedance. However, in the front-end module 510 according to the comparative example, since an individual impedance matching circuit is provided for each signal path, the number of circuit elements defining the impedance matching circuit increases, and the front-end module 510 increases in size. Further, the impedance matching circuit provided for each signal path increases signal transmission loss in each signal path.

On the other hand, in the front-end module 10 according to the present preferred embodiment, since whether the impedance matching circuit 32 connected to the selection terminal 114 is connected/not connected to the signal path is switched by the switch 11 instead of individually providing the impedance matching circuit for each signal path, the signal transmission loss and the number of the circuit elements are reduced as compared to the front-end module 510 according to the comparative example.

Figure 3A:
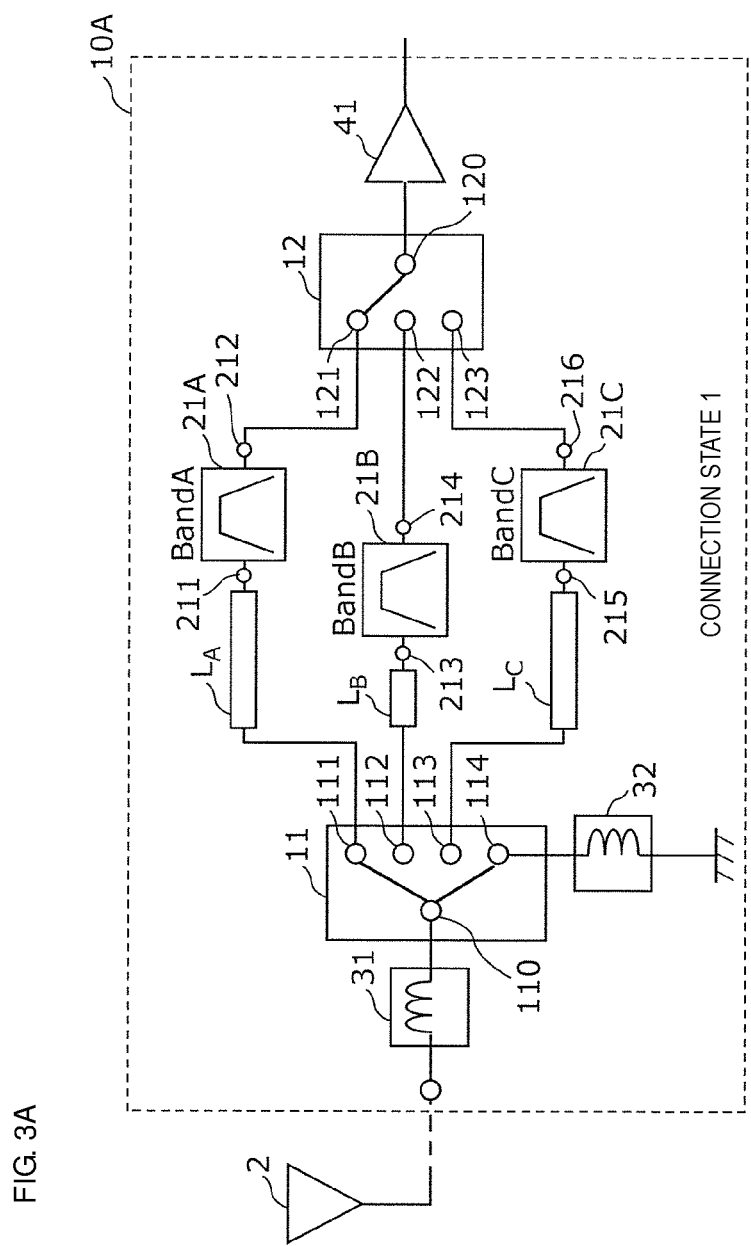
FIG. 3A is a circuit diagram of a front-end module and an antenna element in a connection configuration 1 according to Example 1.

FIG. 3A is a circuit configuration diagram of a front-end module 10A and the antenna element 2 in a connection configuration 1 according to Example 1. The front-end module 10A illustrated in FIG. 3A is a specific example of the front-end module 10 according to a preferred embodiment of the present invention. The front-end module 10A includes the switches 11 and 12, the filters 21A, 21B, and 21C, the reception amplifier circuit 41, and the impedance matching circuits 31 and 32. The front-end module 10A according to Example 1 differs from the front-end module 10 according to the above-described preferred embodiment in specific circuit configurations of the respective impedance matching circuits 31 and 32 and in that a wire connecting the switch 11 and each filter is explicitly shown. Hereinafter, for the front-end module 10A according to Example 1, a description of the same configuration as that of the front-end module 10 according to the above-described preferred embodiment will be omitted, and a different configuration is mainly described.

The switches 11 and 12, the filters 21A, 21B, and 21C, the reception amplifier circuit 41, and the impedance matching circuits 31 and 32, which define the front-end module 10A, are provided on a mounting substrate (not shown) or in the mounting substrate.

The impedance matching circuit 32 is a first impedance matching circuit connected to the selection terminal 114 of the switch 11. More specifically, the impedance matching circuit 32 preferably includes an inductor connected between the selection terminal 114 and the ground, for example.

The impedance matching circuit 31 is a second impedance matching circuit disposed between the antenna element 2 and the switch 11, and connected to the common terminal 110. More specifically, the impedance matching circuit 31 includes an inductor which is preferably inserted in series on a path connecting the antenna element 2 and the switch 11, for example.

The filter 21A and the selection terminal 111 are connected by a wire $L_A$ (first wire) provided on or in the mounting substrate. The filter 21B and the selection terminal 112 are connected by a wire $L_B$ (second wire) provided on or in the mounting substrate. The filter 21C and the selection terminal 113 are connected by a wire $L_C$ provided on or in the mounting substrate.

Here, the wire $L_A$ (first wire) is preferably longer than the wire $L_B$ (second wire). Further, the wire $L_C$ is preferably longer than the wire $L_B$ (second wire). In the present example, the wire $L_A$, the wire $L_B$, and the wire $L_C$ preferably have the same line width.

Here, an impedance in the Band A when viewing the filter 21A alone from the input/output terminal 211, an impedance in the Band B when viewing the filter 21B alone from the input/output terminal 213, and an impedance in the Band C when viewing the filter 21C alone from the input/output terminal 215 are set to be higher than a normalized impedance of the front-end module 10A.

Figure 3B:
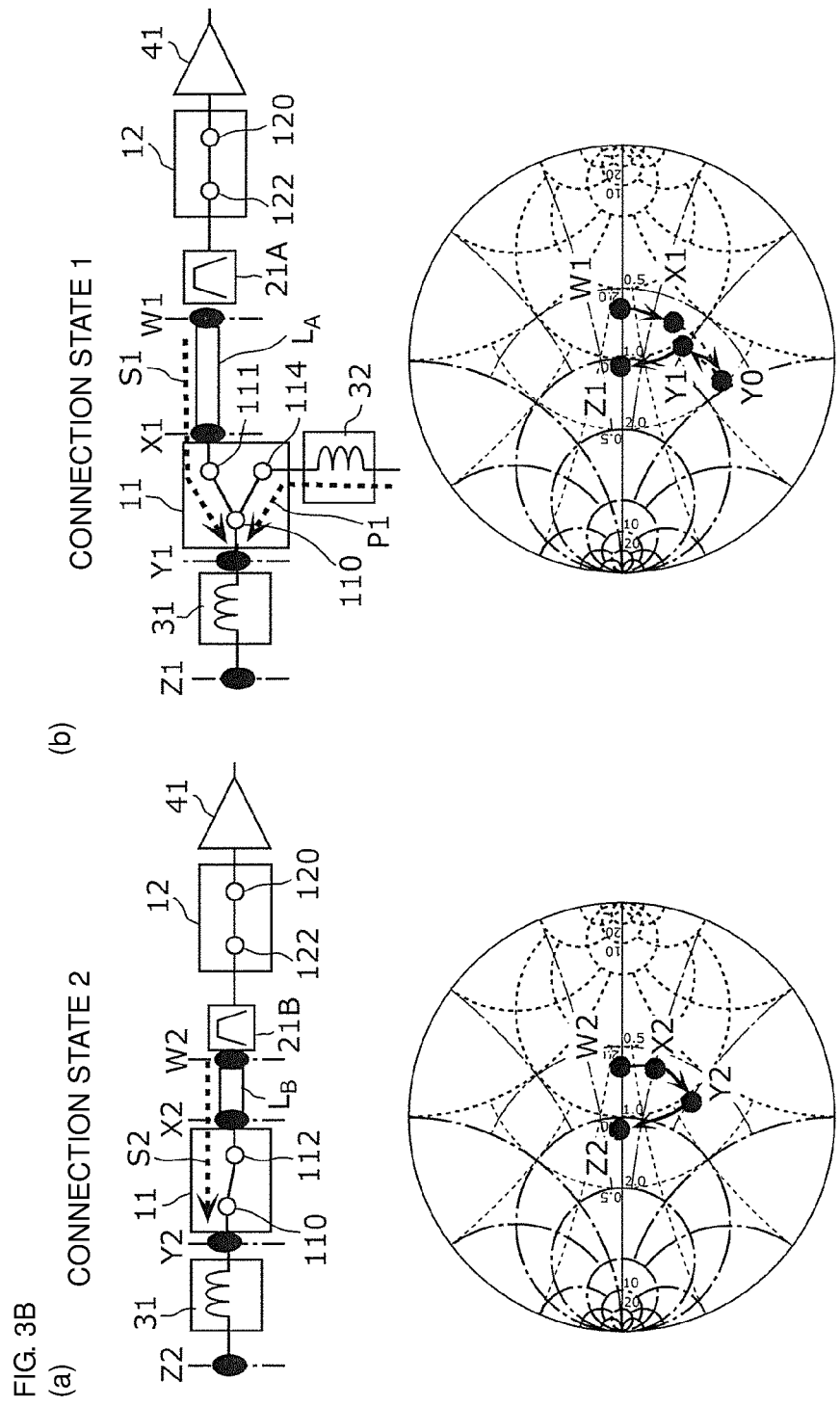
FIG. 3B is a diagram illustrating a change in an impedance at each node of the front-end module according to Example 1.

FIG. 3B is a diagram illustrating a change in an impedance at each node of the front-end module 10A according to Example 1. In (a) of FIG. 3B, an impedance at the Band B of each node in a connection state 2 (a state in which the common terminal 110 and only the selection terminal 112 are connected in the switch 11) is illustrated. Further, (b) of FIG. 3B illustrates an impedance at the Band A of each node in a connection state 1 (a state in which the common terminal 110 is connected to the selection terminal 111 and the common terminal 110 is connected to the selection terminal 114 in the switch 11).

As illustrated in (a) of FIG. 3B, an impedance in the Band B when viewing the filter 21B alone from a connection node W2 (input/output terminal 213) is set to be higher than the normalized impedance (e.g., about 50Ω) as shown in an immittance chart below. Next, an impedance when viewing the filter 21B side from a connection node X2 between the wire $L_B$ and the selection terminal 112 is made capacitive by shifting along the equiconductance circle clockwise due to parasitic capacitance of the wire $L_B$. Furthermore, an impedance when viewing the filter 21B side from a connection node Y2 between the common terminal 110 and the impedance matching circuit 31 is further shifted along the equiconductance circle clockwise due to parasitic capacitance of the switch 11. Finally, an impedance when viewing the filter 21B side from an input side node Z2 of the impedance matching circuit 31 is set to be equal or substantially equal to the normalized impedance of the front-end module 10A by shifting along an equiresistance circle counterclockwise by a series inductor of the impedance matching circuit 31. In this manner, in the connection state 2, by taking into account the shift to be capacitive by the wire $L_B$ and the switch 11, and by setting in advance the impedance in the Band B when viewing the filter 21B alone to be higher than the normalized impedance, an impedance in the Band B at an input end of the front-end module 10A is matched to the normalized impedance.

On the other hand, as illustrated in (b) of FIG. 3B, an impedance in the Band A when viewing the filter 21A alone from a connection node W1 (input/output terminal 211) is set to be higher than the normalized impedance (e.g., about 50Ω) as shown in an immittance chart below. Next, an impedance when viewing the filter 21A side from a connection node X1 between the wire $L_A$ and the selection terminal 111 is made capacitive by shifting along the equiconductance circle clockwise due to parasitic capacitance of the wire $L_A$. At this time, since the wire $L_A$ is longer than the wire $L_B$, a capacitive shift amount of an impedance caused by the wire $L_A$ (a distance between W1 and X1 in the immittance chart of (b) of FIG. 3B) becomes larger than a capacitive shift amount of an impedance caused by the wire $L_B$ (a distance between W2 and X2 in the immittance chart of (a) of FIG. 3B). Furthermore, an impedance when viewing the filter 21A side from a connection node Y1 between the common terminal 110 and the impedance matching circuit 31 is further shifted along the equiconductance circle clockwise due to the parasitic capacitance of the switch 11. In other words, a capacitive shift amount of an impedance caused by the wire $L_A$ and the switch 11 in the connection state 1 (a distance between W1 and Y0 in the immittance chart of (b) of FIG. 3B) becomes larger than a capacitive shift amount of an impedance caused by the wire $L_B$ and the switch 11 in the connection state 2 (a distance between W2 and Y2 in the immittance chart of (a) of FIG. 3B). In this state, even in a case of shifting along the equiresistance circle counterclockwise by the series inductor of the impedance matching circuit 31, an impedance when viewing the filter 21A side from an input side node Z1 of the impedance matching circuit 31 does not coincide with the normalized impedance of the front-end module 10A. Accordingly, in the connection state 1 using a signal path of the Band A having a characteristic that the wire $L_A$ is relatively long, the impedance matching circuit 32 is connected to the common terminal 110. As a result, the impedance when viewing the filter 21A side from the connection node Y1 is able to be set to an impedance equal or substantially equal to that of Y2 in the connection state 2, since a position Y0 in the immittance chart of (b) of FIG. 3B shifts along the equiconductance circle counterclockwise to Y1. Finally, the impedance when viewing the filter 21A side from the input side node Z1 of the impedance matching circuit 31, is equal or substantially equal to the normalized impedance of the front-end module 10A, by shifting along the equiresistance circle counterclockwise by the series inductor configuring the impedance matching circuit 31. In this manner, in the connection state 1, by taking into account the shift to be capacitive by the wire $L_A$ and the switch 11, by setting in advance the impedance in the Band A when viewing the filter 21A alone to be higher than the normalized impedance, and by connecting the impedance matching circuit 32 to the common terminal 110, an impedance in the Band A at an input end of the front-end module 10A is matched to the normalized impedance.

As described above, according to the front-end module 10A of Example 1, in the connection state 2, the impedance when viewing the filter 21B side from the common terminal 110 is shifted to be more capacitive than an impedance of the filter 21B alone due to parasitic capacitance of the wire $L_B$ and the switch 11.

Compared to this, in the connection state 1, an impedance when viewing the filter 21A side from the common terminal 110 becomes an impedance which is shifted to be more capacitive than an impedance in the connection state 2 due to parasitic capacitance of the wire $L_A$ which is longer than the wire $L_B$ and the switch 11. However, since a shunt inductor of the impedance matching circuit 32 is connected, the impedance when viewing the filter 21A side from the common terminal 110 is shifted counterclockwise along the equiconductance circle on the immittance chart, and thus is able to be set to be equal or substantially equal to the impedance when viewing the filter 21B side from the common terminal 110 in the connection state 2.

Figure 4:
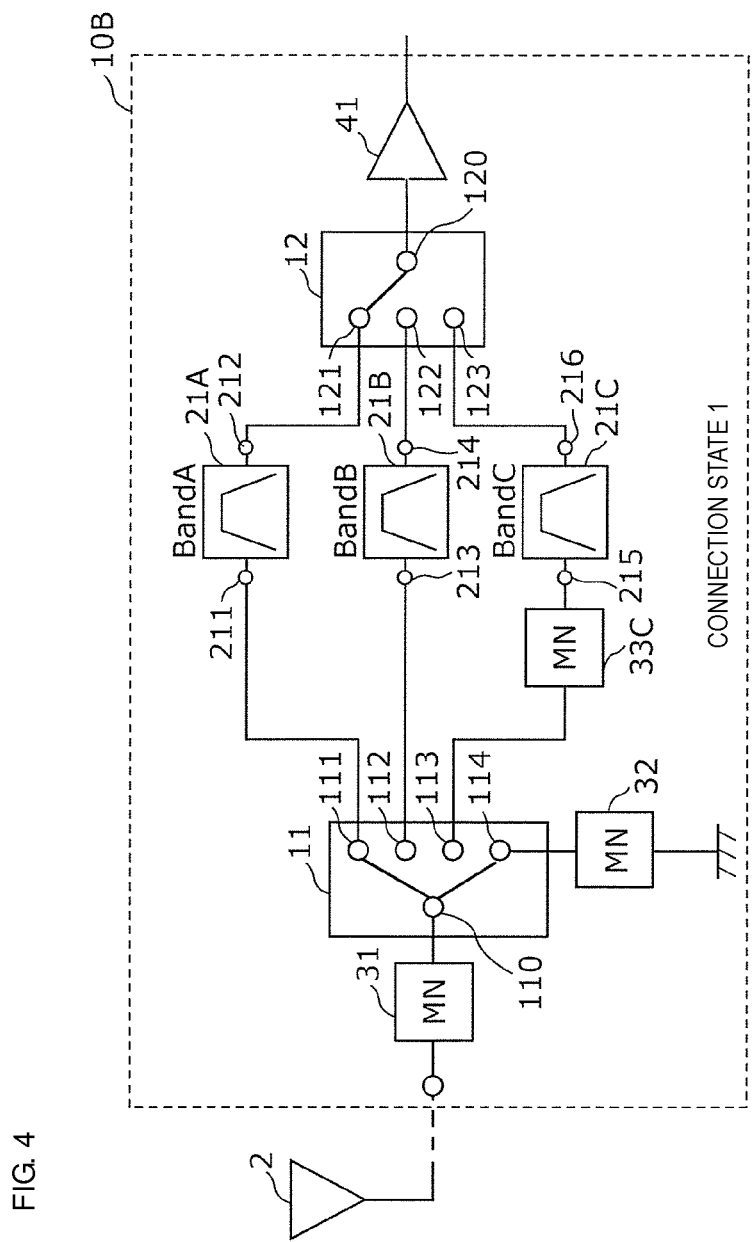
FIG. 4 is a circuit diagram of a front-end module and an antenna element according to Modification 1 of a preferred embodiment of the present invention.

FIG. 4 is a circuit configuration diagram of a front-end module 10B and the antenna element 2 according to Modification 1 of a preferred embodiment of the present invention. The front-end module 10B illustrated in FIG. 4 includes the switches 11 and 12, the filters 21A, 21B, and 21C, the reception amplifier circuit 41, the impedance matching circuits 31 and 32, and an impedance matching circuit 33C. The front-end module 10B according to Modification 1 is different from the front-end module 10 according to the above-described preferred embodiment in that the impedance matching circuit 33C is added. Hereinafter, for the front-end module 10B according to Modification 1, a description of the same configuration as that of the front-end module 10 according to the above-described preferred embodiment will be omitted, and a different configuration is mainly described.

The impedance matching circuit 33C is connected between the selection terminal 113 and the filter 21C. In FIG. 4, the impedance matching circuit 33C has a circuit configuration in which the impedance matching circuit 33C is inserted in series on a path connecting the selection terminal 113 and the filter 21C, but it is sufficient that one end of the impedance matching circuit 33C is connected to the path, and a connection destination of another end thereof may be grounded.

Note that, FIG. 4 illustrates a state in which the common terminal 110 and the selection terminal 111 are connected and the common terminal 110 and the selection terminal 114 are connected (connection state 1).

When a high-frequency signal of the Band C is transmitted through the impedance matching circuit 33C, the common terminal 110 and only the selection terminal 113 are connected, thus it is possible to correct a capacitive shift of an impedance due to parasitic capacitance of the wire $L_C$ connecting the selection terminal 113 and the filter 21C and the switch 11.

Note that, in this modification, the impedance matching circuit 33C is provided in a signal path that transmits a high-frequency signal of the Band C among three signal paths that transmit high-frequency signals of the Band A, the Band B, and the Band C. In addition, an impedance matching circuit may be provided on a signal path that transmits a high-frequency signal of the Band A, or on a signal path that transmits a high-frequency signal of the Band B. In other words, the following configuration may be sufficient for the front-end module according to a preferred embodiment of the present invention. That is, an impedance matching circuit is not provided on at least one signal path (a path connecting a selection terminal of the switch 11 and a filter) among a plurality of signal paths included in the front-end module, and the impedance matching circuit 32 that is able to be connected to any of the signal paths is connected to a selection terminal of the switch 11.

Figure 5A:
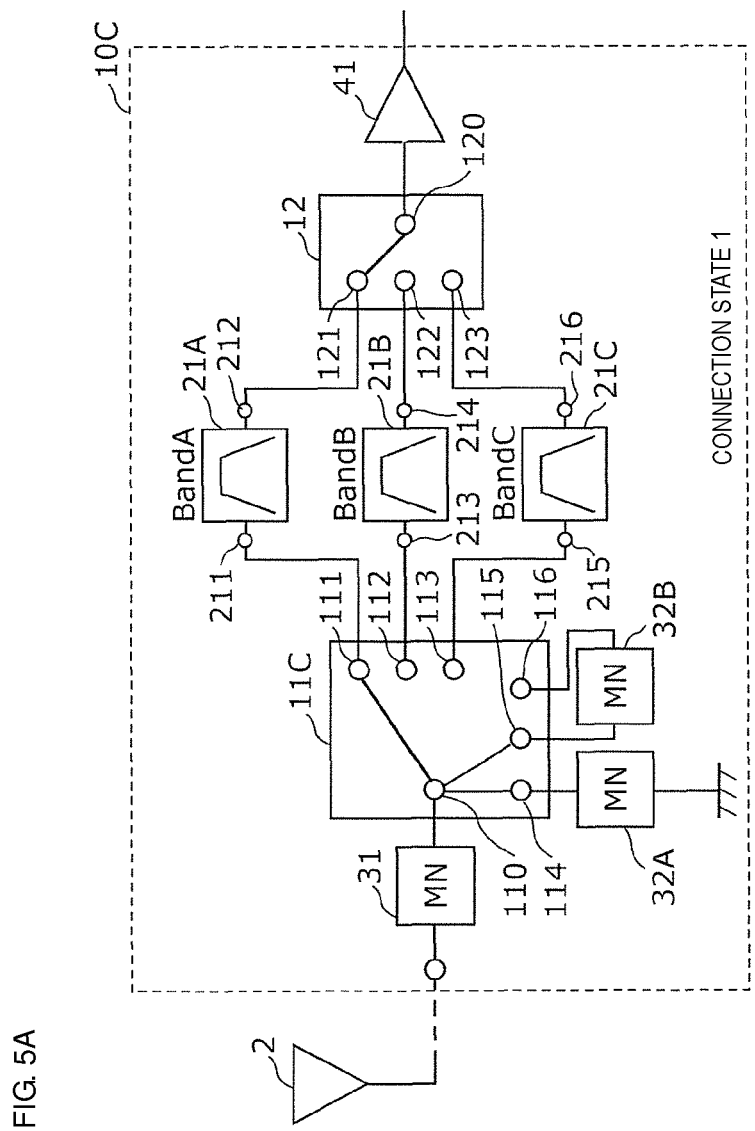
FIG. 5A is a circuit diagram of a front-end module and an antenna element in a connection configuration 1 according to Modification 2 of a preferred embodiment of the present invention.
Figure 5B:
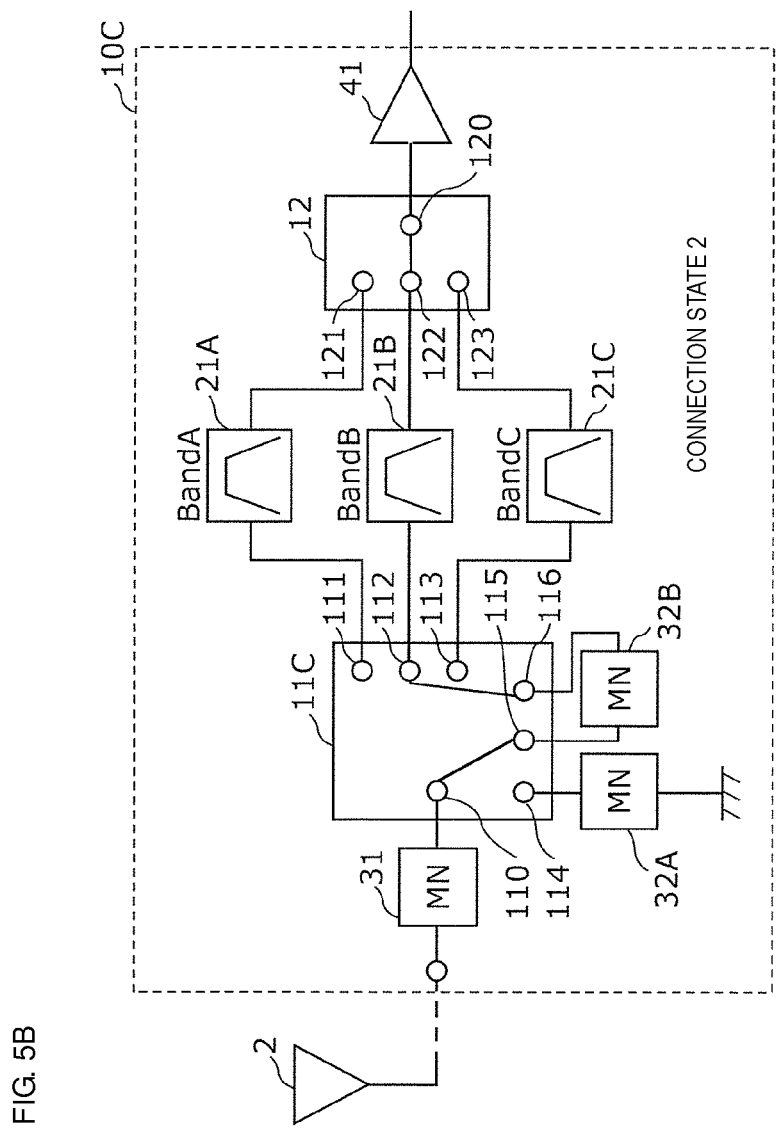
FIG. 5B is a circuit diagram of a front-end module and an antenna element in a connection configuration 2 according to Modification 2.
Figure 5C:
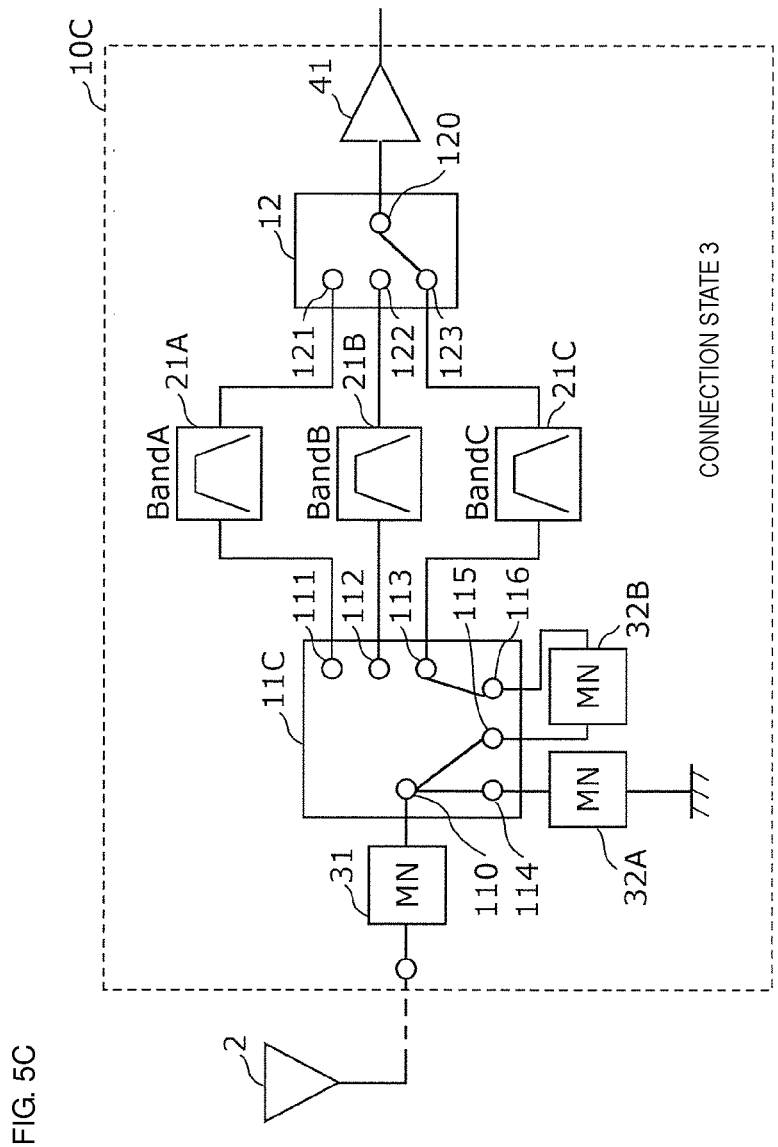
FIG. 5C is a circuit diagram of a front-end module and an antenna element in a connection configuration 3 according to Modification 2.

FIG. 5A is a circuit diagram of a front-end module 10C and the antenna element 2 in a connection configuration 1 according to Modification 2 of a preferred embodiment of the present invention. Additionally, FIG. 5B is a circuit diagram of the front-end module 10C and the antenna element 2 in a connection configuration 2 according to Modification 2. FIG. 5C is a circuit configuration diagram of the front-end module 10C and the antenna element 2 in a connection configuration 3 according to Modification 2. As illustrated in FIGS. 5A to 5C, the front-end module 10C includes a switch 11C, the switch 12, the filters 21A, 21B and 21C, the reception amplifier circuit 41, the impedance matching circuit 31, and impedance matching circuits 32A and 32B. As compared to the front-end module 10 according to the above-described preferred embodiment, the front-end module 10C according to the present modification differs in a configuration of the switch 11C and the impedance matching circuits connected thereto. Hereinafter, for the front-end module 10C according to the present modification, the same description as that of the front-end module 10 according to the above-described preferred embodiment will be omitted, and a different configuration is mainly described.

The switch 11C is disposed between the impedance matching circuit 31 and the filters 21A to 21C, and is a first switch including the common terminal 110 (first common terminal), and the selection terminals 111 (first selection terminal), 112 (second selection terminal), 113, 114 (third selection terminals), 115 (fifth selection terminal) and 116 (sixth selection terminal). The common terminal 110 and the selection terminal 115 are connected.

The switch 11C exclusively switches among (1) conduction between the selection terminal 111 and the common terminal 110, (2) conduction between the selection terminal 112 and the common terminal 110, and (3) conduction between the selection terminal 113 and the common terminal 110. More specifically, as a conduction configuration between the selection terminal 111 and the common terminal 110, one of connection between the selection terminal 111 and the common terminal 110, or conduction between the selection terminal 111 and the common terminal 110 via the selection terminal 116, the impedance matching circuit 32B, and the selection terminal 115 is selected. As a conduction configuration between the selection terminal 112 and the common terminal 110, one of connection between the selection terminal 112 and the common terminal 110, or conduction between the selection terminal 112 and the common terminal 110 via the selection terminal 116, the impedance matching circuit 32B, and the selection terminal 115 is selected. As a conduction configuration between the selection terminal 113 and the common terminal 110, one of connection between the selection terminal 113 and the common terminal 110, or conduction between the selection terminal 113 and the common terminal 110 via the selection terminal 116, the impedance matching circuit 32B, and the selection terminal 115 is selected. Further, the switch 11C switches between conduction and non-conduction between the selection terminal 114 and the common terminal 110. In other words, the switch 11C is a multiport ON switch capable of simultaneously connecting the common terminal and the plurality of selection terminals and connecting the selection terminals to each other to enable the above-described conduction configurations.

The impedance matching circuit 32A is a first parallel matching circuit connected between the selection terminal 114 among the plurality of selection terminals and the ground. By conduction between the selection terminal 114 and the common terminal 110, the impedance matching circuit 32A is able to be shunt-connected on a path connecting the common terminal 110 and each filter. Therefore, it is possible to change an impedance when viewing the filter side from the common terminal 110 to a predetermined impedance.

Further, the impedance matching circuit 32B is a first series matching circuit connected between the selection terminal 115 and the selection terminal 116 among the plurality of selection terminals. When the selection terminal 111 and the selection terminal 116 are connected, the impedance matching circuit 32B is inserted in series between the selection terminal 111 and the common terminal 110, when the selection terminal 112 and the selection terminal 116 are connected, the impedance matching circuit 32B is inserted in series between the selection terminal 112 and the common terminal 110, and when the selection terminal 113 and the selection terminal 116 are connected, the impedance matching circuit 32B is inserted in series between the selection terminal 113 and the common terminal 110.

Note that each of the impedance matching circuits 32A and 32B preferably has a circuit configuration in which, for example, circuit elements, such as inductors and capacitors, are connected in series or in parallel.

For example, as illustrated in FIG. 5A, when a high-frequency signal of the Band A is transmitted, the common terminal 110 and the selection terminal 111 are connected, the common terminal 110 and the selection terminal 114 are connected, and the common terminal 120 and the selection terminal 121 are connected (connection configuration 1). Thus, a path connecting the antenna element 2, the impedance matching circuit 31, the switch 11C, the filter 21A, the switch 12, and the reception amplifier circuit 41 is provided, and the impedance matching circuit 32A is shunt-connected to the path.

Further, for example, as illustrated in FIG. 5B, when a high-frequency signal of Band B is transmitted, the selection terminal 112 and the selection terminal 116 are connected, and the common terminal 120 and the selection terminal 122 are connected (connection configuration 2). Thus, a path connecting the antenna element 2, the impedance matching circuit 31, the impedance matching circuit 32B (switch 11C), the filter 21B, the switch 12, and the reception amplifier circuit 41 is provided, and the impedance matching circuit 32B is inserted in series on the path.

For example, as illustrated in FIG. 5C, when a high-frequency signal of Band C is transmitted, the selection terminal 113 and the selection terminal 116 are connected, the common terminal 110 and the selection terminal 114 are connected, and the common terminal 120 and the selection terminal 123 are connected (a connection configuration 3). Thus, a path connecting the antenna element 2, the impedance matching circuit 31, the impedance matching circuit 32B (switch 11C), the filter 21C, the switch 12, and the reception amplifier circuit 41 is provided, and the impedance matching circuit 32B is inserted in series on the path, and the impedance matching circuit 32A is shunt-connected to the path.

In the connection configurations described above, in the front-end module 10C, one of the filters 21A to 21C is connected to the antenna element 2 and the reception amplifier circuit 41 by switching the switches 11C and 12. Further, since the impedance matching circuit 32B is connected to the selection terminals 115 and 116 of the switch 11C and the impedance matching circuit 32A is connected to the selection terminal 114, the impedance matching circuits 32A and 32B are able to be selectively added to a selected signal path without adding an impedance matching circuit for each signal path in which each of the filters 21A to 21C is disposed. Thus, the impedance when viewing the filter side from the common terminal 110 is able to be matched in a wide band with a high degree of accuracy.

Thus, for example, depending on three signal transmission modes, such as selection of one of the filters 21A to 21C, a plurality of connection configurations of impedance matching circuits including the above-described connection configurations 1 to 3 are able to be selected as appropriate.

Note that, in the present modification, the two impedance matching circuits 32A and 32B are preferably connected to the switch 11C, for example, but a configuration in which only the impedance matching circuit 32B is connected to the switch 11C suffices.

Figure 6A:
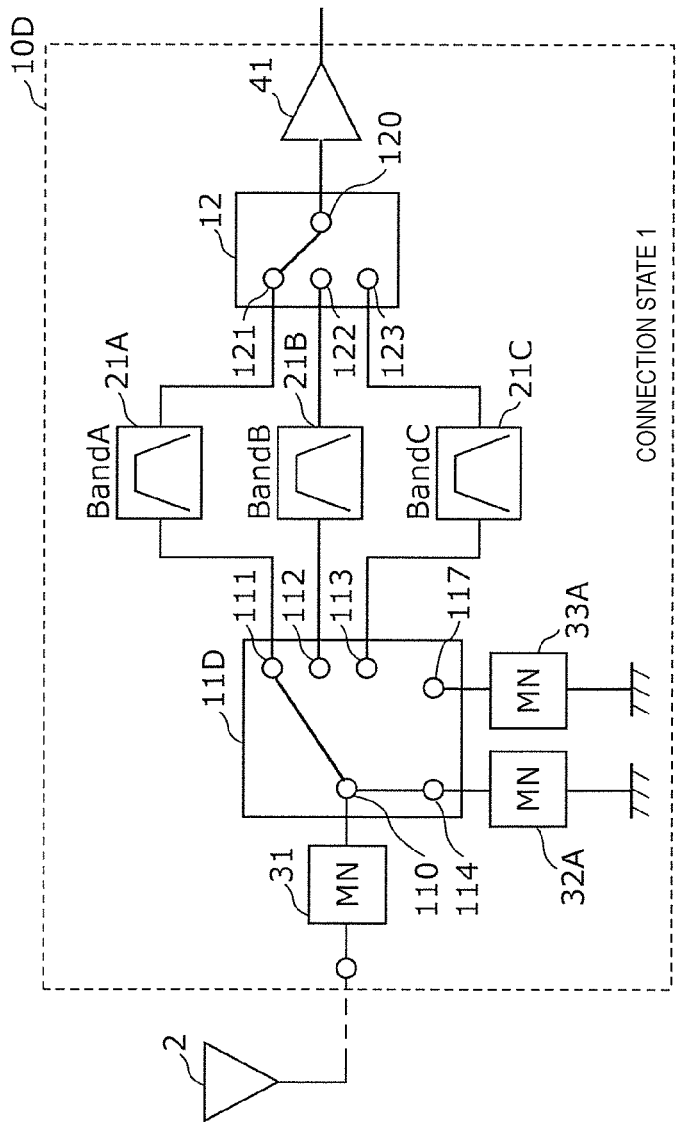
FIG. 6A is a circuit diagram of a front-end module and an antenna element in a connection configuration 1 according to Modification 3 of a preferred embodiment of the present invention.
Figure 6B:
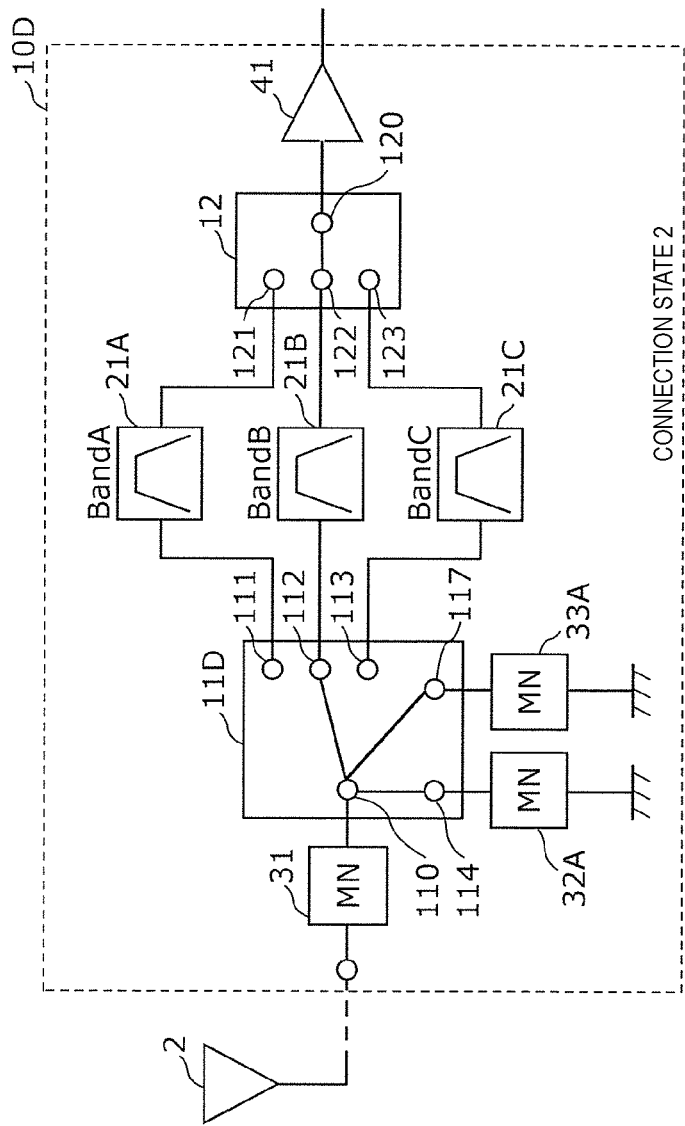
FIG. 6B is a circuit diagram of a front-end module and an antenna element in a connection configuration 2 according to Modification 3.
Figure 6C:
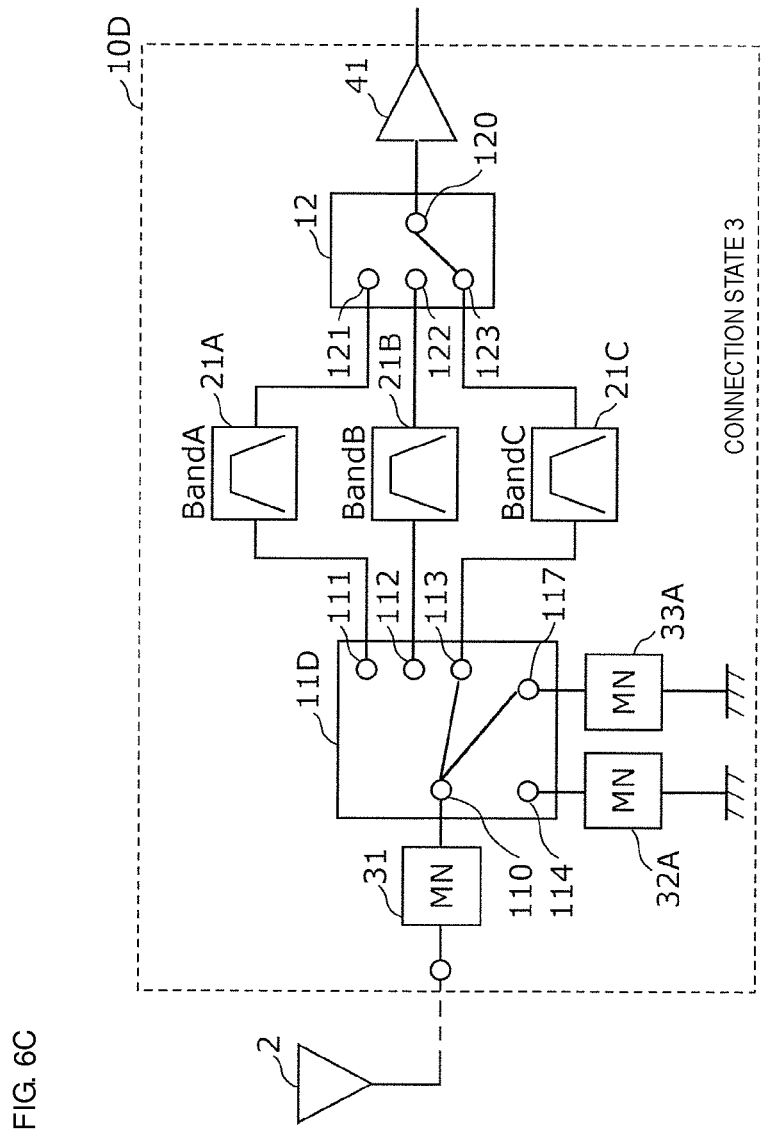
FIG. 6C is a circuit diagram of a front-end module and an antenna element in a connection configuration 3 according to Modification 3.

FIG. 6A is a circuit diagram of a front-end module 10D and the antenna element 2 in a connection configuration 1 according to Modification 3 of a preferred embodiment of the present invention. Additionally, FIG. 6B is a circuit diagram of the front-end module 10D and the antenna element 2 in a connection configuration 2 according to Modification 3. FIG. 6C is a circuit diagram of the front-end module 10D and the antenna element 2 in a connection configuration 3 according to Modification 3. As illustrated in FIGS. 6A to 6C, the front-end module 10D includes a switch 11D, the switch 12, the filters 21A, 21B, and 21C, the reception amplifier circuit 41, the impedance matching circuits 31 and 32A, and an impedance matching circuit 33A. As compared to the front-end module 10 according to the above-described preferred embodiment, the front-end module 10D according to the present modification differs in a configuration of the switch 11D and an impedance matching circuit connected thereto. Hereinafter, for the front-end module 10D according to the present modification, the same description as that of the front-end module 10 according to the above-described preferred embodiment will be omitted, and a different configuration is mainly described.

The switch 11D is disposed between the impedance matching circuit 31 and the filters 21A to 21C, and is a first switch including the common terminal 110 (first common terminal), and the selection terminals 111 (first selection terminal), 112 (second selection terminal), 113, 114 (third selection terminals), and 117 (fourth selection terminal).

The switch 11D is a multiport ON switch which is capable of exclusively switching among conduction between the selection terminal 111 and the common terminal 110, conduction between the selection terminal 112 and the common terminal 110, conduction between the selection terminal 113 and the common terminal 110, capable of switching between conduction and non-conduction between the selection terminal 114 and the common terminal 110, and capable of switching between conduction and non-conduction between the selection terminal 117 and the common terminal 110.

The impedance matching circuit 32A is a first parallel matching circuit connected between the selection terminal 114 among the plurality of selection terminals and the ground. By conduction between the selection terminal 114 and the common terminal 110, the impedance matching circuit 32A is able to be shunt-connected on a path connecting the common terminal 110 and each filter. Therefore, it is possible to change an impedance when viewing the filter side from the common terminal 110 to a predetermined impedance.

The impedance matching circuit 33A is a second parallel matching circuit connected between the selection terminal 117 among the plurality of selection terminals and the ground. By conduction between the selection terminal 117 and the common terminal 110, the impedance matching circuit 33A is able to be shunt-connected on the path connecting the common terminal 110 and each filter. Therefore, it is possible to change an impedance when viewing the filter side from the common terminal 110 to a predetermined impedance.

Note that each of the impedance matching circuits 32A and 33A preferably has a circuit configuration in which, for example, circuit elements, such as inductors and capacitors, are connected in series or in parallel.

For example, as illustrated in FIG. 6A, when a high-frequency signal of the Band A is transmitted, the common terminal 110 and the selection terminal 111 are connected, the common terminal 110 and the selection terminal 114 are connected, and the common terminal 120 and the selection terminal 121 are connected (connection configuration 1). Thus, a path connecting the antenna element 2, the impedance matching circuit 31, the switch 11D, the filter 21A, the switch 12, and the reception amplifier circuit 41 is provided, and the impedance matching circuit 32A is shunt-connected to the path.

Further, for example, as illustrated in FIG. 6B, when a high-frequency signal of the Band B is transmitted, the common terminal 110 and the selection terminal 112 are connected, the common terminal 110 and the selection terminal 114 are connected, the common terminal 110 and the selection terminal 117 are connected, and the common terminal 120 and the selection terminal 122 are connected (connection configuration 2). Thus, a path connecting the antenna element 2, the impedance matching circuit 31, the switch 11D, the filter 21B, the switch 12, and the reception amplifier circuit 41 is provided, and the impedance matching circuits 32A and 33A are shunt-connected to the path.

Further, for example, as illustrated in FIG. 6C, when a high-frequency signal of the Band C is transmitted, the common terminal 110 and the selection terminal 113 are connected, the common terminal 110 and the selection terminal 117 are connected, and the common terminal 120 and the selection terminal 123 are connected (connection configuration 3). Thus, a path connecting the antenna element 2, the impedance matching circuit 31, the switch 11D, the filter 21C, the switch 12, and the reception amplifier circuit 41 is provided, and the impedance matching circuit 33A is shunt-connected to the path.

In the connection configuration described above, in the front-end module 10D, one of the filters 21A to 21C is connected to the antenna element 2 and the reception amplifier circuit 41 by switching the switches 11D and 12. Further, since the impedance matching circuit 32A is connected to the selection terminal 114 of the switch 11D and the impedance matching circuit 33A is connected to the selection terminal 117, the impedance matching circuits 32A and 33A is able to be selectively added to a selected signal path without adding an impedance matching circuit for each signal path in which each of the filters 21A to 21C is disposed. Thus, the impedance when viewing the filter side from the common terminal 110 is able to be matched in a wide band with a high degree of accuracy.

Thus, for example, depending on three signal transmission configurations, such as selection of one of the filters 21A to 21C, a plurality of types of connection configurations of impedance matching circuits including the above-described connection configurations are able to be selected as appropriate.

Note that, in the present modification, the switch 11D is connected to the two impedance matching circuits 32A and 33A, but three or more shunt connection impedance matching circuits may be connected corresponding to three or more selection terminals. The larger number of connections of the shunt connection impedance matching circuits makes it possible to match output of the impedance when viewing the filter side from the common terminal 110 with higher accuracy.

Figure 7A:
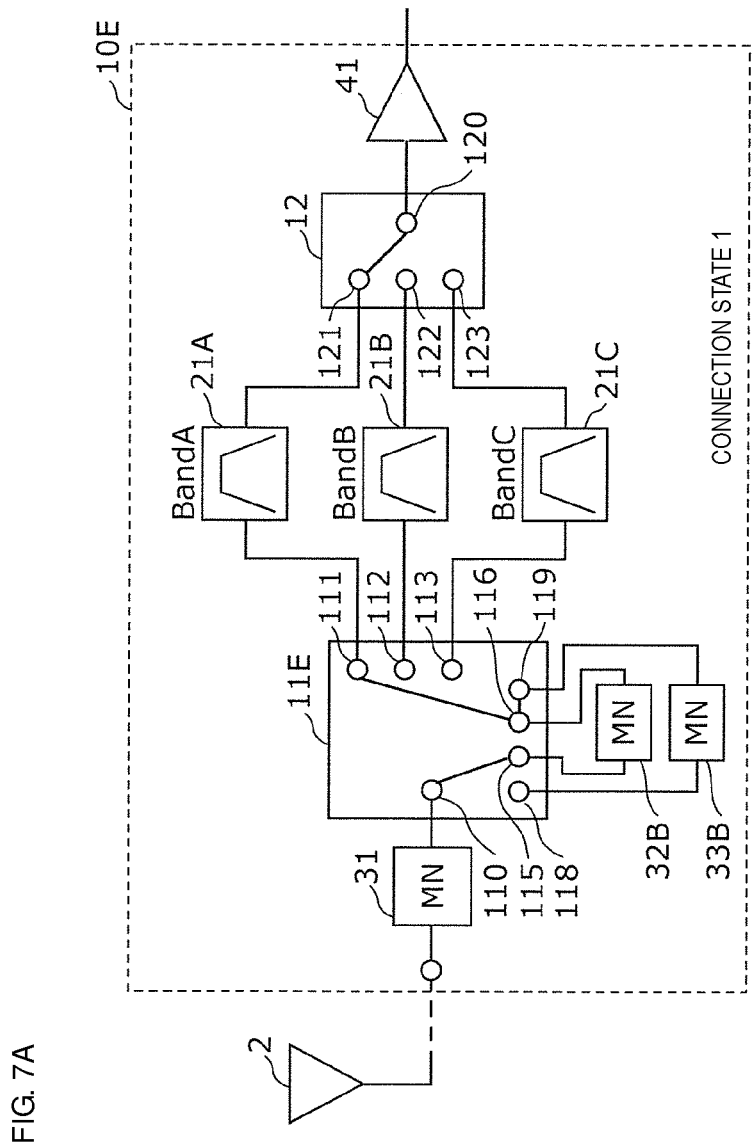
FIG. 7A is a circuit diagram of a front-end module and an antenna element in a connection configuration 1 according to Modification 4 of a preferred embodiment of the present invention.
Figure 7B:
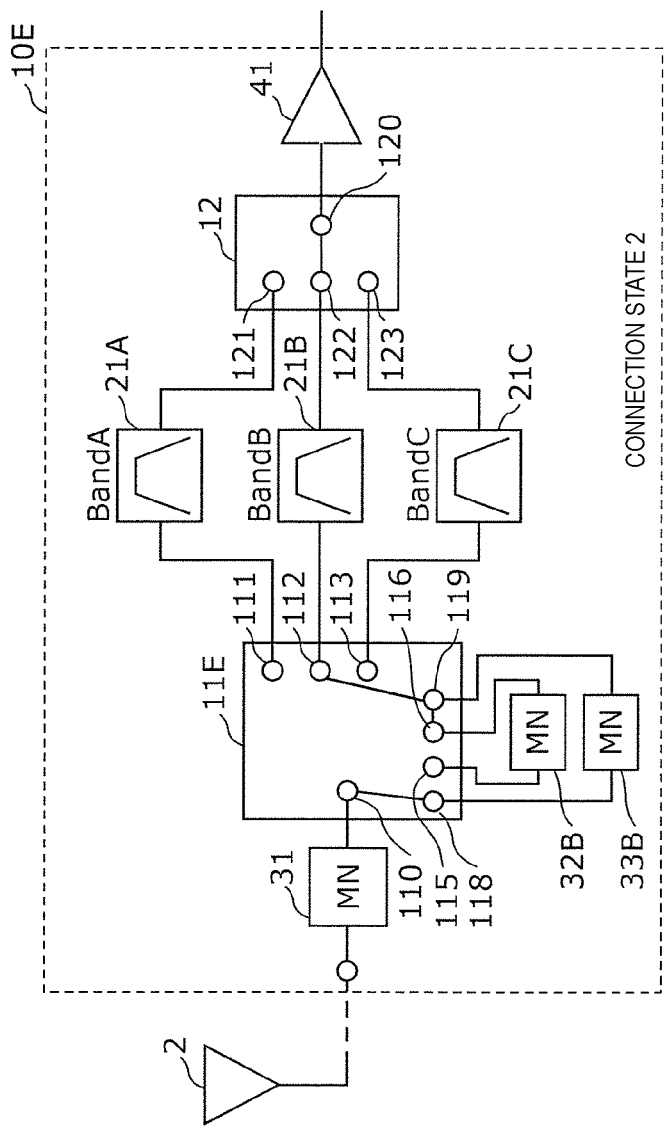
FIG. 7B is a circuit diagram of a front-end module and an antenna element in a connection configuration 2 according to Modification 4.
Figure 7C:
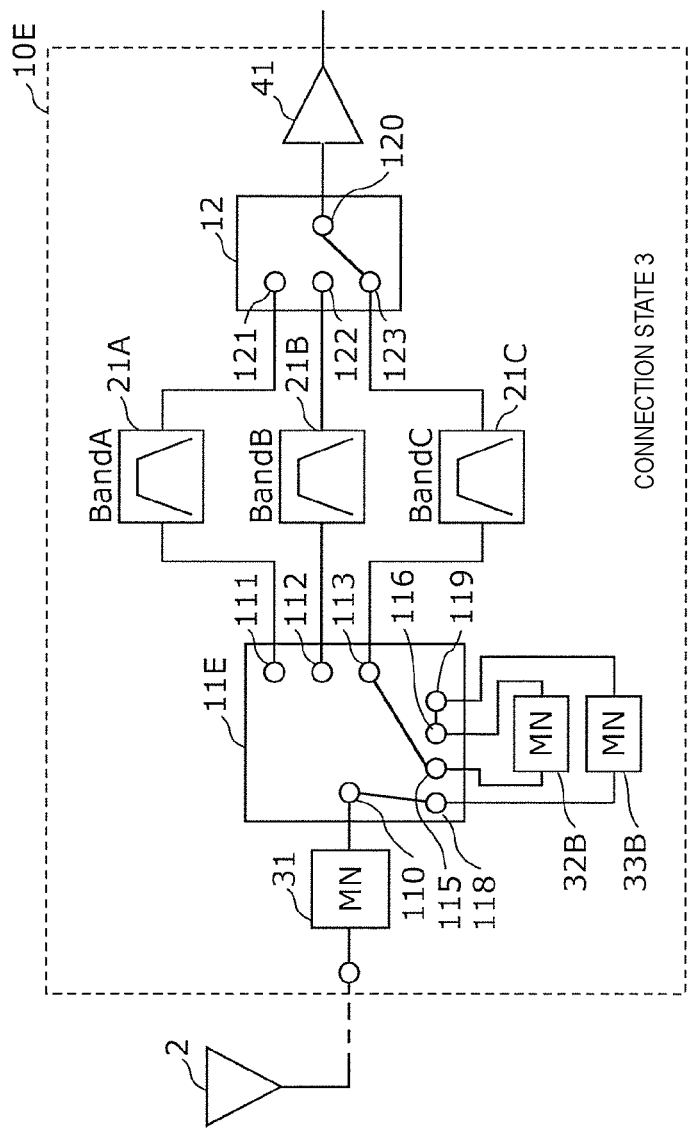
FIG. 7C is a circuit diagram of a front-end module and an antenna element in a connection configuration 3 according to Modification 4.

FIG. 7A is a circuit diagram of a front-end module 10E and the antenna element 2 in a connection configuration 1 according to Modification 4 of a preferred embodiment of the present invention. Additionally, FIG. 7B is a circuit diagram of the front-end module 10E and the antenna element 2 in a connection configuration 2 according to Modification 4. FIG. 7C is a circuit diagram of the front-end module 10E and the antenna element 2 in a connection configuration 3 according to Modification 4. As illustrated in FIGS. 7A to 7C, the front-end module 10E includes a switch 11E, the switch 12, the filters 21A, 21B, and 21C, the reception amplifier circuit 41, the impedance matching circuits 31 and 32B, and an impedance matching circuit 33B. As compared to the front-end module 10 according to the above-described preferred embodiment, the front-end module 10E according to the present modification differs in a configuration of the switch 11E and an impedance matching circuit connected thereto. Hereinafter, for the front-end module 10E according to the present modification, the same description as that of the front-end module 10 according to the above-described preferred embodiment will be omitted, and a different configuration is mainly described.

The switch 11E is disposed between the impedance matching circuit 31 and the filters 21A to 21C, and is a first switch including the common terminal 110 (first common terminal) and the selection terminals 111 (first selection terminal), 112 (second selection terminal), 113, 115 (fifth selection terminal), 116 (sixth selection terminal), 118 (eighth selection terminal), and 119 (seventh selection terminal). The selection terminal 116 and the selection terminal 119 are connected.

The switch 11E exclusively switches among conduction between the selection terminal 111 and the common terminal 110, conduction between the selection terminal 112 and the common terminal 110, and conduction between the selection terminal 113 and the common terminal 110. More specifically, as a conduction configuration between the selection terminal 111 and the common terminal 110, one of the following is selected: connection between the selection terminal 111 and the common terminal 110, conduction between the selection terminal 111 and the common terminal 110 via the selection terminal 116, the impedance matching circuit 32B, and the selection terminal 115, conduction between the selection terminal 111 and the common terminal 110 via the selection terminal 116, the selection terminal 119, the impedance matching circuit 33B, and the selection terminal 118, and conduction between the selection terminal 111 and the common terminal 110 via the selection terminal 118, the impedance matching circuit 33B, the selection terminal 119, the selection terminal 116, the impedance matching circuit 32B, and the selection terminal 115. As a conduction configuration between the selection terminal 112 and the common terminal 110, one of the following is selected: connection between the selection terminal 112 and the common terminal 110, conduction between the selection terminal 112 and the common terminal 110 via the selection terminal 116, the impedance matching circuit 32B, and the selection terminal 115, conduction between the selection terminal 112 and the common terminal 110 via the selection terminal 119, the impedance matching circuit 33B, and the selection terminal 118, and (iv) conduction between the selection terminal 112 and the common terminal 110 via the selection terminal 118, the impedance matching circuit 33B, the selection terminal 119, the selection terminal 116, the impedance matching circuit 32B, and the selection terminal 115. As a conduction configuration between the selection terminal 113 and the common terminal 110, one of the following is selected: connection between the selection terminal 113 and the common terminal 110, conduction between the selection terminal 113 and the common terminal 110 via the selection terminal 116, the impedance matching circuit 32B, and the selection terminal 115, conduction between the selection terminal 113 and the common terminal 110 via the selection terminal 116, the selection terminal 119, the impedance matching circuit 33B, and the selection terminal 118, and conduction between the selection terminal 113 and the common terminal 110 via the selection terminal 118, the impedance matching circuit 33B, the selection terminal 119, the selection terminal 116, the impedance matching circuit 32B, and the selection terminal 115. In other words, the switch 11E is a multiport ON switch capable of simultaneously connecting the common terminal and the plurality of selection terminals and connecting the selection terminals to each other to achieve the above-described conduction configuration.

The impedance matching circuit 32B is a first series matching circuit connected between the selection terminal 115 and the selection terminal 116 among the plurality of selection terminals. By connecting the common terminal 110 and the selection terminal 115 and connecting the selection terminal 111 and the selection terminal 116, the impedance matching circuit 32B is inserted in series between the selection terminal 111 and the common terminal 110. Further, by connecting the common terminal 110 and the selection terminal 115 and connecting the selection terminal 112 and the selection terminal 116, the impedance matching circuit 32B is inserted in series between the selection terminal 112 and the common terminal 110. Further, by connecting the common terminal 110 and the selection terminal 115 and connecting the selection terminal 113 and the selection terminal 116, the impedance matching circuit 32B is inserted in series between the selection terminal 113 and the common terminal 110.

The impedance matching circuit 33B is a second series matching circuit connected between the selection terminal 118 and the selection terminal 119 among the plurality of selection terminals. By connecting the common terminal 110 and the selection terminal 118 and connecting the selection terminal 111 and the selection terminal 119, the impedance matching circuit 33B is inserted in series between the selection terminal 111 and the common terminal 110. Further, by connecting the common terminal 110 and the selection terminal 118 and connecting the selection terminal 112 and the selection terminal 119, the impedance matching circuit 33B is inserted in series between the selection terminal 112 and the common terminal 110. Further, by connecting the common terminal 110 and the selection terminal 118 and connecting the selection terminal 113 and the selection terminal 119, the impedance matching circuit 33B is inserted in series between the selection terminal 113 and the common terminal 110. Further, by connecting the common terminal 110 and the selection terminal 118 and connecting the selection terminal 111 and the selection terminal 115, a series-connected circuit including the impedance matching circuits 32B and 33B is inserted in series between the selection terminal 111 and the common terminal 110. Further, by connecting the common terminal 110 and the selection terminal 118 and connecting the selection terminal 112 and the selection terminal 115, the series-connected circuit including the impedance matching circuits 32B and 33B is inserted in series between the selection terminal 112 and the common terminal 110. Further, by connecting the common terminal 110 and the selection terminal 118 and connecting the selection terminal 113 and the selection terminal 115, the series-connected circuit including the impedance matching circuits 32B and 33B is inserted in series between the selection terminal 113 and the common terminal 110.

Note that each of the impedance matching circuits 32B and 33B preferably has a circuit configuration in which, for example, circuit elements, such as inductors and capacitors, are connected in series or in parallel.

For example, as illustrated in FIG. 7A, when a high-frequency signal of the Band A is transmitted, the common terminal 110 and the selection terminal 115 are connected, the selection terminal 116 and the selection terminal 111 are connected, and the common terminal 120 and the selection terminal 121 are connected (connection configuration 1). Thus, a path connecting the antenna element 2, the impedance matching circuit 31, the impedance matching circuit 32B (switch 11E), the filter 21A, the switch 12, and the reception amplifier circuit 41 is provided, and the impedance matching circuit 32B is inserted in series on the path.

Further, for example, as illustrated in FIG. 7B, when a high-frequency signal of the Band B is transmitted, the common terminal 110 and the selection terminal 118 are connected, the selection terminal 119 and the selection terminal 112 are connected, and the common terminal 120 and the selection terminal 122 are connected (connection configuration 2). Thus, a path connecting the antenna element 2, the impedance matching circuit 31, the impedance matching circuit 33B (switch 11E), the filter 21B, the switch 12, and the reception amplifier circuit 41 is provided, and the impedance matching circuit 33B is inserted in series on the path.

Further, for example, as illustrated in FIG. 7C, when a high-frequency signal of the Band C is transmitted, the common terminal 110 and the selection terminal 118 are connected, the selection terminal 115 and the selection terminal 113 are connected, and the common terminal 120 and the selection terminal 123 are connected (connection configuration 3). Thus, a path connecting the antenna element 2, the impedance matching circuit 31, the impedance matching circuits 33B and 32B (switch 11E), the filter 21C, the switch 12, and the reception amplifier circuit 41 is provided, and a series-connected circuit configured with the impedance matching circuits 33B and 32B is inserted in series on the path.

In the connection configuration described above, in the front-end module 10E, one of the filters 21A to 21C is connected to the antenna element 2 and the reception amplifier circuit 41 by switching the switches 11E and 12. Further, since the impedance matching circuit 32B is connected to the selection terminals 115 and 116 of the switch 11E and the impedance matching circuit 33B is connected to the selection terminals 118 and 119, the impedance matching circuits 32B and 33B is able to be selectively added to a selected signal path without adding an impedance matching circuit for each signal path in which each of the filters 21A to 21C is disposed. Thus, the impedance when viewing the filter side from the common terminal 110 is able to be matched in a wide band with a high degree of accuracy.

Thus, for example, depending on three signal transmission configurations, such as selection of one of the filters 21A to 21C, a plurality of types of connection configurations of impedance matching circuits including the above-described connection configurations 1 to 3 are able be selected as appropriate.

Note that, in the present modification, the two impedance matching circuits 32B and 33B are preferably connected to the switch 11E, but three or more series-inserted impedance matching circuits may be connected. The larger number of connections of the series-inserted impedance matching circuits makes it possible to match output of the impedance when viewing the filter side from the common terminal 110 with higher accuracy.

While front-end modules and communication devices according to the present invention have been described with reference to the preferred embodiments, the example, and the modifications, the present invention is not limited to the above-described preferred embodiments, the example, and the modifications. Another preferred embodiment achieved by combining appropriate elements in the above-described preferred embodiments, for example, and the modifications; a modification obtained by applying various modifications made by those skilled in the art without departing from the scope of the present invention to the above-described preferred embodiments; and various devices including the front-end modules and the communication devices according to preferred embodiments of the present invention are included in the present invention.

Further, for example, in the front-end module 10 and the communication device 1 according to the above-described preferred embodiment, an inductor or a capacitor may be connected between the respective elements. Note that the inductor may include a wiring inductor defined by a wire connecting the respective elements.

Further, although the front-end module 10 according to the above-described preferred embodiment is described as an example of a front-end circuit of a reception system, the front-end module 10 may be a front-end circuit of a transmission system. In this case, a transmission amplifier circuit, such as a power amplifier, is provided instead of the reception amplifier circuit. Furthermore, a front-end circuit including both of a reception signal path and a transmission signal path may be used.

Preferred embodiments of the present invention and modifications thereof are widely applicable to communication devices, such as a cellular phone, for example, as a small front-end module and communication devices with impedance matching which are able to be applied to a multi-band system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A front-end module comprising:
 a first switch including a first common terminal and a plurality of selection terminals;
 a first filter including a first frequency band as a pass band, a first input/output terminal, and a second input/output terminal, the first input/output terminal being connected to a first selection terminal among the plurality of selection terminals;
 a second filter including a second frequency band different from the first frequency band as a pass band, a third input/output terminal, and a fourth input/output terminal, the third input/output terminal being connected to a second selection terminal among the plurality of selection terminals; and
 a first impedance matching circuit connected to one or more selection terminals different from the first selection terminal and the second selection terminal among the plurality of selection terminals; wherein
 an impedance in the first frequency band when viewing a first filter side from the first common terminal in a state in which the first common terminal is connected to only the first selection terminal among the plurality of selection terminals is different from an impedance in the second frequency band when viewing a second filter side from the first common terminal in a state in which the first common terminal is connected to only the second selection terminal among the plurality of selection terminals;
 when the first common terminal is in a connection state with the first selection terminal and the first common terminal is in a non-connection state with the second selection terminal, the first common terminal is in a connection state with one selection terminal among the one or more selection terminals; and
 when the first common terminal is in a connection state with the second selection terminal and the first common terminal is in a non-connection state with the first selection terminal, the first common terminal is in a non-connection state with the one selection terminal.

2. The front-end module according to claim 1, further comprising a second impedance matching circuit connected to the first common terminal.

3. The front-end module according to claim 1, wherein
 a first wire connecting the first filter and the first selection terminal is longer than a second wire connecting the second filter and the second selection terminal;
 an impedance in the first frequency band when viewing the first filter alone from the first input/output terminal and an impedance in the second frequency band when viewing the second filter alone from the third input/output terminal are higher than a normalized impedance of the front-end module; and
 the first impedance matching circuit includes an inductor connected between the one or more selection terminals and a ground.

4. The front-end module according to claim 1, wherein the first impedance matching circuit includes:
 a first parallel matching circuit connected between a third selection terminal among the plurality of selection terminals and a ground; and
 the first switch exclusively switches between conduction between the first selection terminal and the first common terminal and conduction between the second selection terminal and the first common terminal, and switches between conduction and non-conduction between the third selection terminal and the first common terminal.

5. The front-end module according to claim 4, wherein the first impedance matching circuit further includes:
 a second parallel matching circuit connected between a fourth selection terminal among the plurality of selection terminals and a ground; and
 the first switch exclusively switches between conduction between the first selection terminal and the first common terminal and conduction between the second selection terminal and the first common terminal, switches between conduction and non-conduction between the third selection terminal and the first common terminal, and switches between conduction and non-conduction between the fourth selection terminal and the first common terminal.

6. The front-end module according to claim 1, wherein the first impedance matching circuit includes:
 a first series matching circuit connected between a fifth selection terminal and a sixth selection terminal among the plurality of selection terminals; and
 the first switch exclusively switches between one of connection between the first selection terminal and the first common terminal and conduction between the first selection terminal and the first common terminal via the sixth selection terminal, the first series matching circuit, and the fifth selection terminal, and one of connection between the second selection terminal and the first common terminal and conduction between the second selection terminal and the first common terminal via the sixth selection terminal, the first series matching circuit, and the fifth selection terminal.

7. The front-end module according to claim 6, wherein the first impedance matching circuit further includes:
a second series matching circuit connected between a seventh selection terminal and an eighth selection terminal among the plurality of selection terminals;
the sixth selection terminal and the seventh selection terminal are connected to each other;
the first switch exclusively switches between one of connection between the first selection terminal and the first common terminal, conduction between the first selection terminal and the first common terminal via the sixth selection terminal, the first series matching circuit, and the fifth selection terminal, conduction between the first selection terminal and the first common terminal via the eighth selection terminal, the second series matching circuit, and the seventh selection terminal, and conduction between the first selection terminal and the first common terminal via the fifth selection terminal, the first series matching circuit, the sixth selection terminal, the seventh selection terminal, the second series matching circuit, and the eighth selection terminal, and one of connection between the second selection terminal and the first common terminal, conduction between the second selection terminal and the first common terminal via the sixth selection terminal, the first series matching circuit, and the fifth selection terminal, conduction between the second selection terminal and the first common terminal via the eighth selection terminal, the second series matching circuit, and the seventh selection terminal, and conduction between the second selection terminal and the first common terminal via the fifth selection terminal, the first series matching circuit, the sixth selection terminal, the seventh selection terminal, the second series matching circuit, and the eighth selection terminal.

8. The front-end module according to claim 1, further comprising:
a second switch including a second common terminal, a ninth selection terminal, and a tenth selection terminal; and
an amplifier connected to the second common terminal; wherein
the second input/output terminal and the ninth selection terminal are connected to each other;
the fourth input/output terminal and the tenth selection terminal are connected to each other; and
the second switch switches between connection and non-connection between the amplifier and the first filter, and switches between connection and non-connection between the amplifier and the second filter.

9. A communication device, comprising:
an RF signal processing circuit that processes a high-frequency signal received by an antenna element; and
the front-end module according to claim 1 that transmits the high-frequency signal between the antenna element and the RF signal processing circuit.

10. The communication device according to claim 9, further comprising a second impedance matching circuit connected to the first common terminal.

11. The communication device according to claim 9, wherein
a first wire connecting the first filter and the first selection terminal is longer than a second wire connecting the second filter and the second selection terminal;
an impedance in the first frequency band when viewing the first filter alone from the first input/output terminal and an impedance in the second frequency band when viewing the second filter alone from the third input/output terminal are higher than a normalized impedance of the front-end module; and
the first impedance matching circuit includes an inductor connected between the one or more selection terminals and a ground.

12. The communication device according to claim 9, wherein
the first impedance matching circuit includes:
a first parallel matching circuit connected between a third selection terminal among the plurality of selection terminals and a ground; and
the first switch exclusively switches between conduction between the first selection terminal and the first common terminal and conduction between the second selection terminal and the first common terminal, and switches between conduction and non-conduction between the third selection terminal and the first common terminal.

13. The communication device according to claim 12, wherein
the first impedance matching circuit further includes:
a second parallel matching circuit connected between a fourth selection terminal among the plurality of selection terminals and a ground; and
the first switch exclusively switches between conduction between the first selection terminal and the first common terminal and conduction between the second selection terminal and the first common terminal, switches between conduction and non-conduction between the third selection terminal and the first common terminal, and switches between conduction and non-conduction between the fourth selection terminal and the first common terminal.

14. The communication device according to claim 9, wherein
the first impedance matching circuit includes:
a first series matching circuit connected between a fifth selection terminal and a sixth selection terminal among the plurality of selection terminals; and
the first switch exclusively switches between one of connection between the first selection terminal and the first common terminal and conduction between the first selection terminal and the first common terminal via the sixth selection terminal, the first series matching circuit, and the fifth selection terminal, and one of connection between the second selection terminal and the first common terminal and conduction between the second selection terminal and the first common terminal via the sixth selection terminal, the first series matching circuit, and the fifth selection terminal.

15. The communication device according to claim 14, wherein
the first impedance matching circuit further includes:
a second series matching circuit connected between a seventh selection terminal and an eighth selection terminal among the plurality of selection terminals;
the sixth selection terminal and the seventh selection terminal are connected to each other;

the first switch exclusively switches between one of connection between the first selection terminal and the first common terminal, conduction between the first selection terminal and the first common terminal via the sixth selection terminal, the first series matching circuit, and the fifth selection terminal, conduction between the first selection terminal and the first common terminal via the eighth selection terminal, the second series matching circuit, and the seventh selection terminal, and conduction between the first selection terminal and the first common terminal via the fifth selection terminal, the first series matching circuit, the sixth selection terminal, the seventh selection terminal, the second series matching circuit, and the eighth selection terminal, and one of connection between the second selection terminal and the first common terminal, conduction between the second selection terminal and the first common terminal via the sixth selection terminal, the first series matching circuit, and the fifth selection terminal, conduction between the second selection terminal and the first common terminal via the eighth selection terminal, the second series matching circuit, and the seventh selection terminal, and conduction between the second selection terminal and the first common terminal via the fifth selection terminal, the first series matching circuit, the sixth selection terminal, the seventh selection terminal, the second series matching circuit, and the eighth selection terminal.

16. The communication device according to claim 9, further comprising:

a second switch including a second common terminal, a ninth selection terminal, and a tenth selection terminal; and an amplifier connected to the second common terminal; wherein the second input/output terminal and the ninth selection terminal are connected to each other;

the fourth input/output terminal and the tenth selection terminal are connected to each other; and the second switch switches between connection and non-connection between the amplifier and the first filter, and switches between connection and non-connection between the amplifier and the second filter.

\* \* \* \* \*